(12) United States Patent
Fleizach et al.

(10) Patent No.: US 8,707,195 B2
(45) Date of Patent: Apr. 22, 2014

(54) DEVICES, METHODS, AND GRAPHICAL USER INTERFACES FOR ACCESSIBILITY VIA A TOUCH-SENSITIVE SURFACE

(75) Inventors: Christopher Brian Fleizach, Santa Clara, CA (US); Reginald Hudson, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 175 days.

(21) Appl. No.: 12/795,633

(22) Filed: Jun. 7, 2010

(65) Prior Publication Data

US 2011/0302519 A1 Dec. 8, 2011

(51) Int. Cl.
*G06F 3/048* (2013.01)

(52) U.S. Cl.
USPC .................. 715/773; 715/810; 715/978

(58) Field of Classification Search
USPC .................................. 715/773, 810, 978
See application file for complete search history.

(56) References Cited

U.S. PATENT DOCUMENTS

| | | |
|---|---|---|
| 4,746,770 A | 5/1988 | McAvinney |
| 5,053,758 A | 10/1991 | Cornett et al. |
| 5,119,079 A | 6/1992 | Hube et al. |
| 5,327,528 A | 7/1994 | Hidaka et al. |
| 5,502,803 A | 3/1996 | Yoshida et al. |
| 5,513,309 A | 4/1996 | Meier et al. |
| 5,649,133 A | 7/1997 | Arquié |
| 5,761,485 A | 6/1998 | Munyan |
| 5,832,528 A | 11/1998 | Kwatinetz et al. |
| 5,943,043 A | 8/1999 | Furuhata et al. |
| 6,046,722 A | 4/2000 | McKiel, Jr. |
| 6,073,036 A | 6/2000 | Heikkinen et al. |
| 6,075,537 A | 6/2000 | Adapathya et al. |
| 6,088,023 A | 7/2000 | Louis et al. |
| 6,115,482 A | 9/2000 | Sears et al. |
| 6,128,007 A | 10/2000 | Seybold |

(Continued)

FOREIGN PATENT DOCUMENTS

| | | |
|---|---|---|
| DE | 43 40 679 | 6/1995 |
| EP | 0 776 097 A2 | 11/1996 |

(Continued)

OTHER PUBLICATIONS

American Thermoform Corp., "Touch Screen, Talking Tactile Tablet," downloaded Jul. 30, 2008, http://www.americanthermoform.com/tactiletablet.htm, 2 pages.

(Continued)

*Primary Examiner* — David Phantana Angkool
(74) *Attorney, Agent, or Firm* — Morgan, Lewis & Bockius LLP

(57) ABSTRACT

An accessible electronic device with a display and a touch-sensitive surface: displays a first plurality of user-selectable objects; detects a finger contact on the touch-sensitive surface; detects movement of the finger contact across the touch sensitive surface to an activation region that corresponds to a first user-selectable object; while detecting the finger contact at the activation region, initiates output of audible accessibility information associated with the first user-selectable object; detects termination of the finger contact while the finger contact is at the activation region that corresponds to the first user-selectable object; and, in response: performs a predefined operation associated with the first user-selectable object if the device has output at least a predefined portion of the audible accessibility information associated with the first user-selectable object when the termination of the finger contact is detected; and forgoes performing the predefined operation otherwise.

23 Claims, 24 Drawing Sheets

(56) References Cited

U.S. PATENT DOCUMENTS

| | | | |
|---|---|---|---|
| 6,211,856 B1 | 4/2001 | Choi et al. | |
| 6,246,983 B1 | 6/2001 | Zou et al. | |
| 6,384,743 B1* | 5/2002 | Vanderheiden | 341/21 |
| 6,396,523 B1 | 5/2002 | Segal et al. | |
| 6,442,523 B1 | 8/2002 | Siegel | |
| 6,446,041 B1 | 9/2002 | Reynar et al. | |
| 6,466,203 B2 | 10/2002 | Van Ee | |
| 6,489,951 B1 | 12/2002 | Wong et al. | |
| 6,664,989 B1 | 12/2003 | Snyder et al. | |
| 6,717,600 B2 | 4/2004 | Dutta et al. | |
| 6,765,557 B1 | 7/2004 | Segal et al. | |
| 6,926,609 B2 | 8/2005 | Martin | |
| 6,989,847 B2 | 1/2006 | Konar et al. | |
| 7,062,437 B2 | 6/2006 | Kovales et al. | |
| 7,098,896 B2* | 8/2006 | Kushler et al. | 345/168 |
| 7,187,394 B2 | 3/2007 | Chandane | |
| 7,250,938 B2* | 7/2007 | Kirkland et al. | 345/168 |
| 7,376,523 B2* | 5/2008 | Sullivan et al. | 702/56 |
| 7,408,538 B2 | 8/2008 | Hinckley et al. | |
| 7,479,949 B2 | 1/2009 | Jobs et al. | |
| 7,546,550 B1 | 6/2009 | Buck | |
| 7,603,621 B2 | 10/2009 | Toyama et al. | |
| 7,614,008 B2 | 11/2009 | Ording | |
| 7,637,421 B1* | 12/2009 | Trocme | 235/379 |
| 7,944,437 B2 | 5/2011 | Imamura | |
| 8,059,101 B2 | 11/2011 | Westerman et al. | |
| 8,103,554 B2 | 1/2012 | Tom | |
| 8,237,666 B2 | 8/2012 | Soo et al. | |
| 8,411,590 B2* | 4/2013 | Wang | 370/254 |
| 2002/0046195 A1 | 4/2002 | Martin et al. | |
| 2002/0120455 A1* | 8/2002 | Nakata | 704/275 |
| 2002/0133350 A1 | 9/2002 | Cogliano | |
| 2003/0020754 A1 | 1/2003 | Berman | |
| 2003/0046082 A1 | 3/2003 | Siegel | |
| 2004/0263491 A1 | 12/2004 | Ishigki | |
| 2005/0024322 A1 | 2/2005 | Kupka | |
| 2005/0134578 A1 | 6/2005 | Chambers et al. | |
| 2005/0216867 A1 | 9/2005 | Marvit et al. | |
| 2006/0119588 A1 | 6/2006 | Yoon et al. | |
| 2006/0132460 A1 | 6/2006 | Kolmykov-Zotov et al. | |
| 2006/0230340 A1 | 10/2006 | Parsons et al. | |
| 2006/0242607 A1 | 10/2006 | Hudson | |
| 2007/0011011 A1 | 1/2007 | Cogliano | |
| 2007/0033543 A1 | 2/2007 | Ngari et al. | |
| 2007/0152980 A1 | 7/2007 | Kocienda et al. | |
| 2007/0230748 A1 | 10/2007 | Foss | |
| 2007/0236475 A1* | 10/2007 | Wherry | 345/173 |
| 2007/0262964 A1 | 11/2007 | Zotov et al. | |
| 2007/0268270 A1 | 11/2007 | Onodera et al. | |
| 2007/0268317 A1 | 11/2007 | Banay | |
| 2008/0027726 A1 | 1/2008 | Hansen et al. | |
| 2008/0077871 A1 | 3/2008 | Baar et al. | |
| 2008/0114599 A1 | 5/2008 | Slotznick et al. | |
| 2008/0122796 A1 | 5/2008 | Jobs et al. | |
| 2008/0140413 A1 | 6/2008 | Millman et al. | |
| 2008/0165141 A1 | 7/2008 | Christie | |
| 2008/0165148 A1 | 7/2008 | Williamson et al. | |
| 2008/0273813 A1 | 11/2008 | Takashima | |
| 2008/0300874 A1 | 12/2008 | Gavalda et al. | |
| 2008/0316183 A1 | 12/2008 | Westerman et al. | |
| 2009/0083665 A1 | 3/2009 | Anttila et al. | |
| 2009/0164936 A1 | 6/2009 | Kawaguchi | |
| 2009/0235203 A1 | 9/2009 | Iizuka | |
| 2009/0265656 A1 | 10/2009 | Jetha et al. | |
| 2009/0303187 A1* | 12/2009 | Pallakoff | 345/169 |
| 2009/0313020 A1 | 12/2009 | Koivunen | |
| 2009/0319935 A1 | 12/2009 | Figura | |
| 2010/0001953 A1* | 1/2010 | Yamamoto et al. | 345/158 |
| 2010/0063880 A1 | 3/2010 | Atsmon et al. | |
| 2010/0070281 A1 | 3/2010 | Conkie et al. | |
| 2010/0073565 A1 | 3/2010 | Hwang et al. | |
| 2010/0231541 A1 | 9/2010 | Cruz-Hernandez et al. | |
| 2010/0262907 A1 | 10/2010 | Shoemaker et al. | |
| 2010/0283742 A1 | 11/2010 | Lam | |
| 2010/0289757 A1 | 11/2010 | Budelli | |
| 2010/0309147 A1* | 12/2010 | Fleizach et al. | 345/173 |
| 2010/0309148 A1* | 12/2010 | Fleizach et al. | 345/173 |
| 2010/0313125 A1* | 12/2010 | Fleizach et al. | 715/702 |
| 2010/0324903 A1 | 12/2010 | Kurzweil et al. | |
| 2010/0325529 A1 | 12/2010 | Sun | |
| 2011/0050594 A1 | 3/2011 | Kim et al. | |
| 2011/0078597 A1 | 3/2011 | Rapp et al. | |
| 2011/0083104 A1 | 4/2011 | Minton | |
| 2011/0157028 A1 | 6/2011 | Stallings et al. | |
| 2011/0264452 A1 | 10/2011 | Venkataramu et al. | |
| 2011/0298723 A1 | 12/2011 | Fleizach et al. | |
| 2011/0310026 A1 | 12/2011 | Davis et al. | |
| 2012/0056840 A1 | 3/2012 | Benko et al. | |

FOREIGN PATENT DOCUMENTS

| | | |
|---|---|---|
| EP | 1 942 398 A1 | 7/2008 |
| JP | 63 271516 | 11/1988 |
| JP | 01 283621 | 11/1989 |
| JP | 02 244214 | 9/1990 |
| JP | 7 321889 | 12/1995 |
| JP | 09 190436 | 7/1997 |
| JP | 2001 147775 | 5/2001 |
| JP | 2003 316254 | 11/2003 |
| JP | 2004 151614 | 5/2004 |
| JP | 2005 010894 | 1/2005 |
| JP | 2006 501567 | 1/2006 |
| JP | 2006 134090 | 5/2006 |
| JP | 2007 095024 | 4/2007 |
| JP | 2008 508600 | 3/2008 |
| JP | 2009 093291 | 4/2009 |
| WO | WO 92/08183 | 5/1992 |

OTHER PUBLICATIONS

Apple.com, "VoiceOver," May 2009, http://www.apple.com/accessibility/vocieover, 5 pages.

Apple Inc., "iPad User Guide," Apple Inc., © 2010, 154 pages.

Appshopper, "GDial Free—Speed Dial with Gesture," appshopper.com, Mar. 25, 2009, http://appshopper.com/utilities/gdial-free-speed-dial-with-gesture, 2 pages.

CNET, "Sony Ericsson W910," posts, the earliest of which is Oct. 17, 2007, 4 pages, http://news.cnet/crave/?keyword=Sony+Ericsson+W910.

Esther, "GarageBand," AppleVis, Mar. 11, 2011, http://www.applevis.com/app-directory/music/garageband, 4 pages.

Immersion, "Haptics: Improving the Mobile User Experience through Touch," Immersion Corporation White Paper, © 2007 Immersion Corporation, 12 pages, http://www.immersion.com/docs/haptics_mobile-ue_nov07v1.pdf.

Jaques, R., "HP unveils Pocket PC for blind users," vnunet.com, Jul. 5, 2004, http://www.vnunet.com/vnunet/news/2125404/hp-unveils-pocket-pc-blind-users, 3 pages.

Joe, "Gesture commander-Amazing feature exclusive to Dolphin Browser," dolphin-browser.com, Jul. 27, 2010, http://dolphin-browser.com/2010/07/amazing-feature-exclusive-to-dolphin-browser-gesture-commander/, 3 pages.

Kane et al., "Slide Rule: Making Mobile Touch Screens Accessible to Blind People Using Multi-Touch Interaction Techniques," Proceedings of ACM SIGACCESS Conference on Computers and Accessibility, Halifax, Nova Scotia, Canada, Oct. 2008, 8 pages.

Kendrick, D., "The Touch That Means So Much: Training Materials for Computer Users Who Are Deaf-Blind," AFB Access World, Mar. 2005, vol. 6, No. 2, http://www.afb.org/afbpress/pub.asp?DocID=aw060207, 9 pages.

Microsoft, "Pocket PC Device for Blind Users Debuts during National Disability Employment Awareness Month," Microsoft.com PressPass, Oct. 16, 2002, http://www.microsoft.com/presspass/features/2002/oct02/10-16-ndeam.mspx, 4 pages.

Okada et al., "CounterVision: A Screen Reader with Multi-Access Interface for GUI," Proceedings of Technology and Persons With Disabilities Conference, Center on Disabilities, CSU Northridge, Mar. 1997, http://www.csun.edu/cod/conf/1997/proceedings/090.htm, 6 pages.

(56) References Cited

OTHER PUBLICATIONS

Raman, T., "Eyes-Free User Interaction," Google Research, Feb. 9, 2009, http://emacspeak.sf.net/raman, 25 pages.
Tiresias.org, "Touchscreens," tiresias.org, Jul. 15, 2008, http://www.tiresias.org/research/guidelines/touch/htm.
Touch Usability, "Mobile," Mar. 12, 2009, http://www.touchusability.com/mobile/, 9 pages.
Vanderheiden, G., "Use of audio-haptic interface techniques to allow nonvisual access to touchscreen appliances," Sep., Oct. 1995, http://trace.wisc.edu/docs/touchscreen/chi_conf.htm, 9 pages.
U.S. Appl. No. 10/826,878, filed Apr. 16, 2004, 61 pages (Migos).
U.S. Appl. No. 10/956,720, filed Oct. 1, 2004, 75 pages (Seymour).
U.S. Appl. No. 11/298,977, filed Dec. 9, 2005, 33 pages (Seymour).
U.S. Appl. No. 11/643,257, filed Dec. 20, 2006, 44 pages (Seymour).
U.S. Appl. No. 11/643,389, filed Dec. 20, 2006, 43 pages (Seymour).
U.S. Appl. No. 11/686,295, filed Mar. 14, 2007, 40 pages (Seymour).
Office Action dated May 25, 2012, U.S. Appl. No. 12/565,744, 16 pages (Fleizach).
Office Action dated Jul. 12, 2012, U.S. Appl. No. 12/565,745, 8 pages (Fleizach).
International Search Report and Written Opinion dated Jun. 22. 2011, International Application No. PCT/US2010/034109, which corresponds to U.S. Appl. No. 12/565,744, 17 pages (Fleizach).
Office Action dated Nov. 18, 2011, U.S. Appl. No. 12/567,697, 23 pages (Rapp).
Frantz et al., "Design case history: Speak & Spell learns to talk," IEEE spectrum, Feb. 1982, 5 pages.
Law et al., "Ez Access Strategies for Cross-Disability Access to Kiosks, Telephones and VCRs," DINF (Disability Information Resources), Feb. 16, 1998, http://www.dinf.ne.jp/doc/english/Us_Eu/conf/csun_98/csun98_074.html, 6 pages.
Vanderheiden, G., "Universal Design and Assistive Technology in Communication and Information Technologies: Alternatives or Complements?" Assistive Technology: The Official Journal of RESNA, 1998, vol. 10, No. 1, 9 pages.
Vintage, "TSI Speech + & other speaking calculators," Vintage Calculators Web Museum, retrieved from the internet May 4, 2012, http://www.vintagecalculators.com/html/speech_.html, 6 pages.
Extended Search Report dated Sep. 27, 2012, European Patent Application No. 12154609.7, which corresponds to U.S. Appl. No. 12/565,744, 7 pages. (Fleizach).
Final Office Action dated Dec. 6, 2012, U.S. Appl. No. 12/565,744, 18 pages (Fleizach).
Office Action dated Nov. 20, 2012, European Patent Application No. 10719502.6, which corresponds to U.S. Appl. No. 12/565,744, 5 pages (Fleizach).
Notice of Allowance dated Jan. 10, 2013, U.S. Appl. No. 12/567,697, 11 pages (Rapp).
Notice of Allowance dated Nov. 26, 2012, U.S. Appl. No. 12/565,745, 9 pages (Fleizach).
Office Action, dated Feb. 13, 2013, Austrailian Patent Applicaton No. 2010259191, which corresponds to U.S. Appl. No. 12/565,744, 3 pages (Fleizach).
European Search Report and Written Opinion dated Jun. 29, 2012, European Patent Application No. 12154613.9, which corresponds to U.S. Appl. No. 12/565,744, 6 pages (Fleizach).
International Search Report and Written Opinion dated Aug. 30, 2012, International Application No. PCT/US2012/040703, which corresponds to U.S. Appl. No. 13/172,479, 11 pages (Fleizach).
International Search Report and Written Opinion dated Nov. 29, 2010, received in International Application No. PCT/US2010/047433, which corresponds to U.S. Appl. No. 12/567,697, 10 pages (Rapp).
Invitation to Pay Additional Fees dated Jul. 22, 2013, International Patent Application No. PCT/US2013/033589, which corresponds to U.S. Appl. No. 13/710,385, 6 pages (Fleizach).
Office Action dated Mar. 26, 2013, Australian Patent Application No. 2012200071, which corresponds to U.S. Appl. No. 13/710,385, 4 pages (Fleizach).
Notice of Acceptance dated Jun. 19, 2013, Australian Patent Application No. 2012200071, which corresponds to U.S. Appl. No. 12/565,744, 2 pages (Fleizach).
Office Action dated Apr. 10, 2013, Australian Patent Application No. 2012200073, which corresponds to U.S. Appl. No. 12/565,744, 4 pages (Fleizach).
Office Action dated May 31, 2013, Japanese Patent Application No. 2012 513959, which corresponds to U.S. Appl. No. 12/565,744, 3 pages (Fleizach).
Office Action dated May 7, 2013, European Patent Application No. 12 154 613.9, which corresponds to U.S. Appl. No. 12/565,744, 6 pages (Fleizach).
Office Action dated May 31, 2013, Japanese Patent Application No. 2012-024483, which corresponds to U.S. Appl. No. 12/565,744, 2 pages (Fleizach).
Office Action dated May 27, 2013, Japanese Patent Application No. 2012 024484, which corresponds to U.S. Appl. No. 12/565,744, 5 pages (Fleizach).
Office Action dated May 7, 2013, Korean Patent Application No. 10-2012-7000663, which coresponds to U.S. Appl. No. 12/565,744, 1 page (Fleizach).
Notice of Allowance dated Mar. 15, 2013, U.S. Appl. No. 12/565,745, 7 pages (Fleizach).
Office Action dated Jul. 19, 2013. U.S. Appl. No. 12/565,746, 22 pages (Fleizach).
Office Action dated Mar. 7, 2013, U.S. Appl. No. 12/795,635, 50 pages (Fleizach).
Office Action dated Jul. 25, 2013, U.S. Appl. No. 12/795,635, 46 pages (Fleizach).
Notice of Allowance dated Feb. 11, 2013, U.S. Appl. No. 12/859,158, 14 pages (Fleizach).

\* cited by examiner $t = t_a$ $t = t_b$ $t = t_c$ $t = t_d$ $t = t_e$ $t = t_f$ t=t_g t=t_h t=t_i t=t_j t=t_k

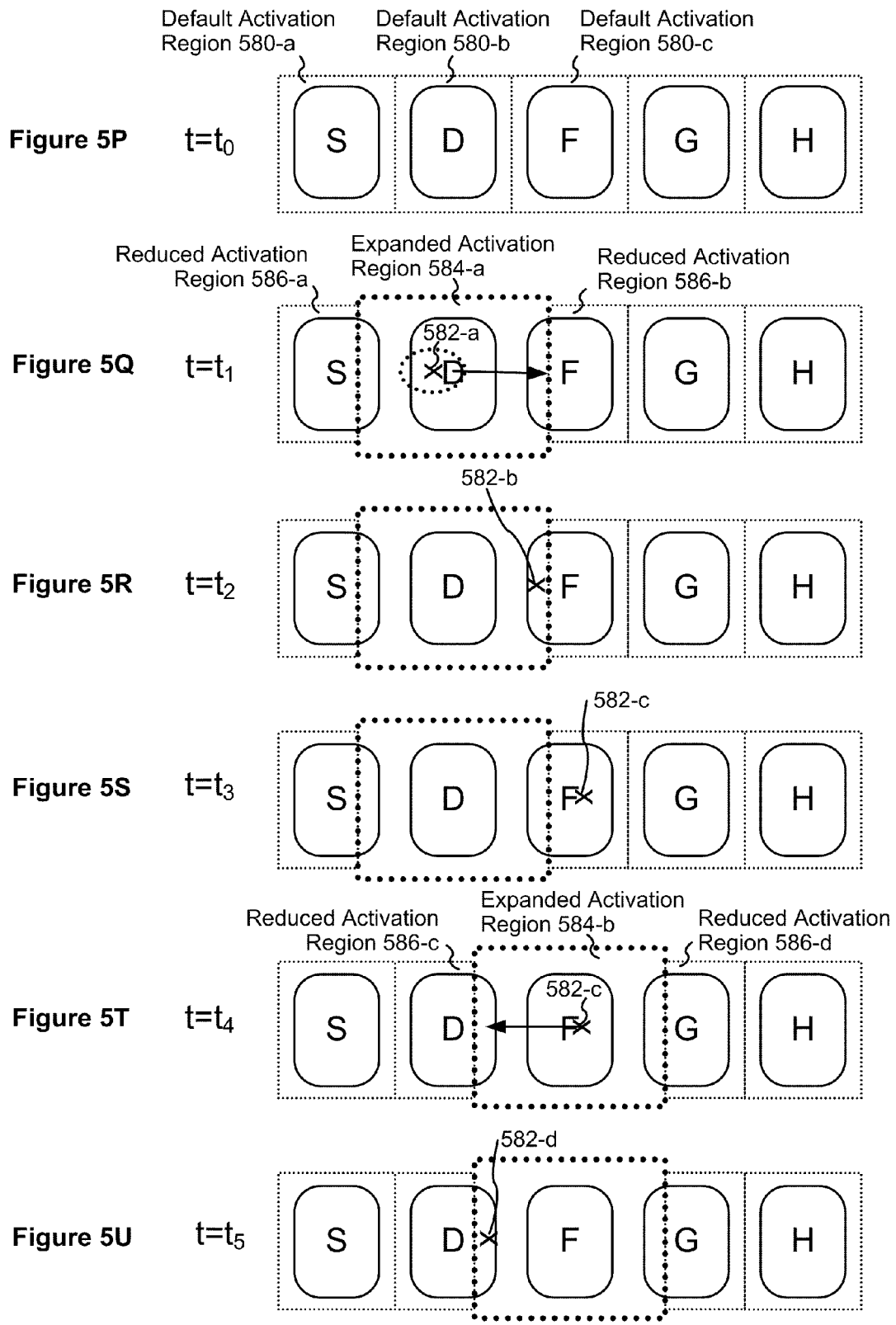

700

- 702 Display a plurality of user-selectable objects on a display, wherein:
  - a respective user-selectable object has a corresponding activation region on the touch-sensitive surface with an activation region size;
  - the activation region size for the respective user-selectable object has a respective default size when a representative point for a finger contact is located outside the activation region for the respective user-selectable object; and
  - the activation region size for the respective user-selectable object has a respective expanded size, larger than the respective default size, when the representative point for the finger contact is located within the activation region for the respective user-selectable object;

- 704 The display is a touch screen display and the touch-sensitive surface is on the display.

- 706 The first plurality of user-selectable objects are character keys in a virtual keyboard.

- 708 The respective default-size activation region for the respective user-selectable object is inside the respective expanded-size activation region for the respective user-selectable object

- 710 Detect movement of the finger contact across the touch-sensitive surface

- 712 Detect movement of the finger contact across the touch-sensitive surface into respective activation regions of a series of user-selectable objects before the representative point for the finger contact is located within the activation region for the respective user-selectable object

- 714 While detecting the finger contact at a respective activation region of a respective user-selectable object in the series of user-selectable objects, initiate output of audible accessibility information associated with the respective user-selectable object in the series of user-selectable objects

802 — Display a plurality of user-selectable objects on a display, wherein:
- a respective user-selectable object has a corresponding activation region on the touch-sensitive surface;
- the activation region for a respective user-selectable object has a respective default size when a representative point for a finger contact is located outside the activation region for the respective user-selectable object and the representative point for the finger contact is not located in an activation region for a user-selectable object that is adjacent to the respective user selectable object on the display;
- the activation region for the respective user-selectable object has a respective expanded size, larger than the default size, when the representative point for the finger contact is located within the activation region of the default size for the respective user-selectable object; and
- the activation region for the respective user-selectable object has a respective reduced size, smaller than the default size, when the representative point for the finger contact is located within an activation region of an expanded size for a user-selectable object that is adjacent to the respective user-selectable object on the display

804 — The display is a touch screen display and the touch-sensitive surface is on the display.

806 — The first plurality of user-selectable objects are character keys in a virtual keyboard.

808 — The respective reduced-size activation region for the respective user-selectable object is inside the respective default-size activation region for the respective user-selectable object; and the respective default-size activation region for the respective user-selectable object is inside the respective expanded-size activation region for the respective user-selectable object.

810 — The respective reduced-size activation region for the respective user-selectable object does not overlap the activation region for the user-selectable object that is adjacent to the respective user-selectable object on the display

Figure 8A

DEVICES, METHODS, AND GRAPHICAL USER INTERFACES FOR ACCESSIBILITY VIA A TOUCH-SENSITIVE SURFACE

RELATED APPLICATIONS

This application is related to U.S. patent application Ser. No. 12/795,635, "Devices, Methods, and Graphical User Interfaces for Accessibility Via a Touch-Sensitive Surface," filed Jun. 7, 2010, which is incorporated by reference herein in its entirety.

TECHNICAL FIELD

The disclosed embodiments relate generally to electronic devices for people with impaired vision, and more particularly, to electronic devices that provide accessibility using a touch-sensitive surface, such as a touch screen display or a track pad.

BACKGROUND

The use of touch-sensitive surfaces as input devices for computers and other electronic devices has increased significantly in recent years. As the use of these touch-sensitive surfaces has increased, the need for touch-based navigation methods that provide accessible navigation feedback has also increased (e.g., audible feedback, haptic feedback, and/or Braille output), especially for people with impaired vision. For example, low-vision users, blind users, dyslexic users or others with learning disabilities, or even sighted users who simply want or need to use a device without looking at the device during operation can benefit from accessibility user interfaces that permit touch-based navigation among user interface elements on the device. For blind users in particular, an effective accessibility interface is not merely an option: it is required to use these devices without assistance from sighted users.

Unfortunately, existing accessibility interfaces on devices with touch-sensitive surfaces remain cumbersome and inefficient. Navigation and activation of user interface elements is often difficult, thereby creating a significant cognitive burden on a user with impaired vision. In addition, existing accessibility methods take longer than necessary, thereby wasting energy. This latter consideration is particularly important in battery-operated devices.

SUMMARY

Accordingly, there is a need for electronic devices with touch-sensitive surfaces (e.g., touch screen displays and/or track pads) with faster, more efficient touch-based accessibility methods and interfaces. Such methods and interfaces may complement or replace existing accessibility methods for navigating and interacting with user interface objects. Such methods and interfaces reduce the cognitive burden on a user with impaired vision and produce a more efficient human-machine interface. For battery-operated devices, such methods and interfaces conserve power and increase the time between battery charges.

The above deficiencies and other problems associated with user interfaces for computing devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad (also known as a "track pad"). In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a method is performed at an accessible electronic device with a touch-sensitive surface and a display. The method includes: displaying a first plurality of user-selectable objects on the display; detecting a first finger contact at a first location on the touch-sensitive surface; detecting movement of the first finger contact across the touch sensitive surface from the first location to an activation region that corresponds to a first user-selectable object in the first plurality of user-selectable objects on the display; while detecting the first finger contact at the activation region that corresponds to the first user-selectable object, initiating output of audible accessibility information associated with the first user-selectable object; detecting termination of the first finger contact with the touch-sensitive surface while the first finger contact is at the activation region that corresponds to the first user-selectable object; and, in response to detecting the termination of the first finger contact: performing a predefined operation associated with the first user-selectable object if the device has output at least a predefined portion of the audible accessibility information associated with the first user-selectable object when the termination of the first finger contact is detected; and forgoing performing the predefined operation associated with the first user-selectable object if the device has not output at least the predefined portion of the audible accessibility information associated with the first user-selectable object when termination of the first finger contact is detected.

In accordance with some embodiments, an accessible electronic device includes a display, a touch-sensitive surface, one or more processors, memory, and one or more programs. The one or more programs are stored in the memory and configured to be executed by the one or more processors. The one or more programs include instructions for: displaying a first plurality of user-selectable objects on the display; detecting a first finger contact at a first location on the touch-sensitive surface; detecting movement of the first finger contact across the touch sensitive surface from the first location to an activation region that corresponds to a first user-selectable object in the first plurality of user-selectable objects on the display; while detecting the first finger contact at the activation region that corresponds to the first user-selectable object, initiating output of audible accessibility information associated with the first user-selectable object; detecting termination of the first finger contact with the touch-sensitive surface while the first finger contact is at the activation region that corresponds to the first user-selectable object; and, in response to detecting the termination of the first finger contact: performing a predefined operation associated with the first user-selectable object if the device has output at least a predefined portion of the audible accessibility information associated with the first user-selectable object when the termination of the first finger contact is detected; and forgoing performing the predefined operation associated with the first user-selectable object if the device has not output at least the predefined portion of the audible accessibility information associated with the first user-selectable object when termination of the first finger contact is detected.

In accordance with some embodiments, a computer readable storage medium has stored therein instructions which when executed by an accessible electronic device with a display and a touch-sensitive surface, cause the device to: display a first plurality of user-selectable objects on the display; detect a first finger contact at a first location on the touch-sensitive surface; detect movement of the first finger contact across the touch sensitive surface from the first location to an activation region that corresponds to a first user-selectable object in the first plurality of user-selectable objects on the display; while detecting the first finger contact at the activation region that corresponds to the first user-selectable object, initiate output of audible accessibility information associated with the first user-selectable object; detecting termination of the first finger contact with the touch-sensitive surface while the first finger contact is at the activation region that corresponds to the first user-selectable object; and, in response to detecting the termination of the first finger contact: perform a predefined operation associated with the first user-selectable object if the device has output at least a predefined portion of the audible accessibility information associated with the first user-selectable object when the termination of the first finger contact is detected; and forgo performing the predefined operation associated with the first user-selectable object if the device has not output at least the predefined portion of the audible accessibility information associated with the first user-selectable object when termination of the first finger contact is detected.

In accordance with some embodiments, a graphical user interface on an accessible electronic device with a display, a touch-sensitive surface, a memory, and one or more processors to execute one or more programs stored in the memory includes a first plurality of user-selectable objects on the display. A first finger contact is detected at a first location on the touch-sensitive surface. Movement of the first finger contact across the touch sensitive surface is detected from the first location to an activation region that corresponds to a first user-selectable object in the first plurality of user-selectable objects on the display. While the first finger contact at the activation region that corresponds to the first user-selectable object is detected, output of audible accessibility information associated with the first user-selectable object is initiated. Termination of the first finger contact with the touch-sensitive surface is detected while the first finger contact is at the activation region that corresponds to the first user-selectable object. In response to detecting the termination of the first finger contact: a predefined operation associated with the first user-selectable object is performed if the device has output at least a predefined portion of the audible accessibility information associated with the first user-selectable object when the termination of the first finger contact is detected; and performing the predefined operation associated with the first user-selectable object is forgone if the device has not output at least the predefined portion of the audible accessibility information associated with the first user-selectable object when termination of the first finger contact is detected.

In accordance with some embodiments, an accessible electronic device includes: a display; a touch-sensitive surface; means for displaying a first plurality of user-selectable objects on the display; means for detecting a first finger contact at a first location on the touch-sensitive surface; means for detecting movement of the first finger contact across the touch sensitive surface from the first location to an activation region that corresponds to a first user-selectable object in the first plurality of user-selectable objects on the display; while detecting the first finger contact at the activation region that corresponds to the first user-selectable object, means for initiating output of audible accessibility information associated with the first user-selectable object; means for detecting termination of the first finger contact with the touch-sensitive surface while the first finger contact is at the activation region that corresponds to the first user-selectable object; and, in response to detecting the termination of the first finger contact: means for performing a predefined operation associated with the first user-selectable object if the device has output at least a predefined portion of the audible accessibility information associated with the first user-selectable object when the termination of the first finger contact is detected; and means for forgoing performing the predefined operation associated with the first user-selectable object if the device has not output at least the predefined portion of the audible accessibility information associated with the first user-selectable object when termination of the first finger contact is detected.

In accordance with some embodiments, an information processing apparatus for use in an accessible electronic device with a display and a touch-sensitive surface includes: means for displaying a first plurality of user-selectable objects on the display; means for detecting a first finger contact at a first location on the touch-sensitive surface; means for detecting movement of the first finger contact across the touch sensitive surface from the first location to an activation region that corresponds to a first user-selectable object in the first plurality of user-selectable objects on the display; while detecting the first finger contact at the activation region that corresponds to the first user-selectable object, means for initiating output of audible accessibility information associated with the first user-selectable object; means for detecting termination of the first finger contact with the touch-sensitive surface while the first finger contact is at the activation region that corresponds to the first user-selectable object; and, in response to detecting the termination of the first finger contact: means for performing a predefined operation associated with the first user-selectable object if the device has output at least a predefined portion of the audible accessibility information associated with the first user-selectable object when the termination of the first finger contact is detected; and means for forgoing performing the predefined operation associated with the first user-selectable object if the device has not output at least the predefined portion of the audible accessibility information associated with the first user-selectable object when termination of the first finger contact is detected.

In accordance with some embodiments, a method is performed at an electronic device with a display and a touch-sensitive surface. The method includes: displaying a plurality of user-selectable objects on the display, wherein: a respective user-selectable object has a corresponding activation region on the touch-sensitive surface with an activation region size; the activation region size for the respective user-selectable object has a respective default size when a representative point for a finger contact is located outside the activation region for the respective user-selectable object; and the activation region size for the respective user-selectable object has a respective expanded size, larger than the respective default size, when the representative point for the finger contact is located within the activation region for the respective user-selectable object; detecting movement of the finger contact across the touch-sensitive surface; in response to detecting movement of the finger contact across the touch-sensitive surface, changing the size of the activation region for the respective user-selectable object between the respective default size and the respective expanded size in accordance with the movement of the finger contact; detecting a user input when the representative point for the finger contact is located within the activation region for the respective user-selectable object; and, in response to detecting the user input when the representative point for the finger contact is located within the activation region for the respective user-selectable object, performing a predefined operation associated with the respective user-selectable object.

In accordance with some embodiments, an electronic device includes a display, a touch-sensitive surface, one or more processors, memory, and one or more programs. The one or more programs are stored in the memory and configured to be executed by the one or more processors. The one or more programs include instructions for: displaying a plurality of user-selectable objects on the display, wherein: a respective user-selectable object has a corresponding activation region on the touch-sensitive surface with an activation region size; the activation region size for the respective user-selectable object has a respective default size when a representative point for a finger contact is located outside the activation region for the respective user-selectable object; and the activation region size for the respective user-selectable object has a respective expanded size, larger than the respective default size, when the representative point for the finger contact is located within the activation region for the respective user-selectable object; detecting movement of the finger contact across the touch-sensitive surface; in response to detecting movement of the finger contact across the touch-sensitive surface, changing the size of the activation region for the respective user-selectable object between the respective default size and the respective expanded size in accordance with the movement of the finger contact; detecting a user input when the representative point for the finger contact is located within the activation region for the respective user-selectable object; and, in response to detecting the user input when the representative point for the finger contact is located within the activation region for the respective user-selectable object, performing a predefined operation associated with the respective user-selectable object.

In accordance with some embodiments, a computer readable storage medium has stored therein instructions which when executed by an electronic device with a display and a touch-sensitive surface, cause the device to: display a plurality of user-selectable objects on the display, wherein: a respective user-selectable object has a corresponding activation region on the touch-sensitive surface with an activation region size; the activation region size for the respective user-selectable object has a respective default size when a representative point for a finger contact is located outside the activation region for the respective user-selectable object; and the activation region size for the respective user-selectable object has a respective expanded size, larger than the respective default size, when the representative point for the finger contact is located within the activation region for the respective user-selectable object; detect movement of the finger contact across the touch-sensitive surface; in response to detecting movement of the finger contact across the touch-sensitive surface, change the size of the activation region for the respective user-selectable object between the respective default size and the respective expanded size in accordance with the movement of the finger contact; detect a user input when the representative point for the finger contact is located within the activation region for the respective user-selectable object; and, in response to detecting the user input when the representative point for the finger contact is located within the activation region for the respective user-selectable object, perform a predefined operation associated with the respective user-selectable object.

In accordance with some embodiments, a graphical user interface on an electronic device with a display, a touch-sensitive surface, a memory, and one or more processors to execute one or more programs stored in the memory includes a first plurality of user-selectable objects on the display. A respective user-selectable object has a corresponding activation region on the touch-sensitive surface with an activation region size. The activation region size for the respective user-selectable object has a respective default size when a representative point for a finger contact is located outside the activation region for the respective user-selectable object. The activation region size for the respective user-selectable object has a respective expanded size, larger than the respective default size, when the representative point for the finger contact is located within the activation region for the respective user-selectable object. Movement of the finger contact across the touch-sensitive surface is detected. In response to detecting movement of the finger contact across the touch-sensitive surface, the size of the activation region for the respective user-selectable object is changed between the respective default size and the respective expanded size in accordance with the movement of the finger contact. A user input is detected when the representative point for the finger contact is located within the activation region for the respective user-selectable object. In response to detecting the user input when the representative point for the finger contact is located within the activation region for the respective user-selectable object, a predefined operation associated with the respective user-selectable object is performed.

In accordance with some embodiments, an electronic device includes: a display; a touch-sensitive surface; means for displaying a plurality of user-selectable objects on the display, wherein: a respective user-selectable object has a corresponding activation region on the touch-sensitive surface with an activation region size; the activation region size for the respective user-selectable object has a respective default size when a representative point for a finger contact is located outside the activation region for the respective user-selectable object; and the activation region size for the respective user-selectable object has a respective expanded size, larger than the respective default size, when the representative point for the finger contact is located within the activation region for the respective user-selectable object; means for detecting movement of the finger contact across the touch-sensitive surface; in response to detecting movement of the finger contact across the touch-sensitive surface, means for changing the size of the activation region for the respective user-selectable object between the respective default size and the respective expanded size in accordance with the movement of the finger contact; means for detecting a user input when the representative point for the finger contact is located within the activation region for the respective user-selectable object; and, in response to detecting the user input when the representative point for the finger contact is located within the activation region for the respective user-selectable object, means for performing a predefined operation associated with the respective user-selectable object.

In accordance with some embodiments, an information processing apparatus for use in an electronic device with a display and a touch-sensitive surface includes: means for displaying a plurality of user-selectable objects on the display, wherein: a respective user-selectable object has a corresponding activation region on the touch-sensitive surface with an activation region size; the activation region size for the respective user-selectable object has a respective default size when a representative point for a finger contact is located outside the activation region for the respective user-selectable object; and the activation region size for the respective user-selectable object has a respective expanded size, larger than the respective default size, when the representative point for the finger contact is located within the activation region for the respective user-selectable object; means for detecting movement of the finger contact across the touch-sensitive surface; in response to detecting movement of the finger contact across the touch-sensitive surface, means for changing the size of the activation region for the respective user-selectable object between the respective default size and the respective expanded size in accordance with the movement of the finger contact; means for detecting a user input when the representative point for the finger contact is located within the activation region for the respective user-selectable object; and, in response to detecting the user input when the representative point for the finger contact is located within the activation region for the respective user-selectable object, means for performing a predefined operation associated with the respective user-selectable object.

In accordance with some embodiments, a method is performed at an electronic device with a display and a touch-sensitive surface. The method includes: displaying a plurality of user-selectable objects on the display. A respective user-selectable object has a corresponding activation region on the touch-sensitive surface with an activation region size. The activation region size for the respective user-selectable object has a respective default size when a representative point for a finger contact is located outside the activation region for the respective user-selectable object and the representative point for the finger contact is not located in an activation region for a user-selectable object that is adjacent to the respective user-selectable object on the display. The activation region size for the respective user-selectable object has a respective expanded size, larger than the respective default size, when the representative point for the finger contact is located within the activation region for the respective user-selectable object. The activation region size for the respective user-selectable object has a respective reduced size, smaller than the respective default size, when the representative point for the finger contact is located within an activation region for a user-selectable object that is adjacent to the respective user-selectable object on the display. The method also includes: detecting movement of the finger contact across the touch-sensitive surface; in response to detecting movement of the finger contact across the touch-sensitive surface, changing the size of the activation region for the respective user-selectable object between the respective default size, the respective expanded size, and the respective reduced size in accordance with the movement of the finger contact; detecting a user input when the representative point for the finger contact is located within the activation region for the respective user-selectable object; and, in response to detecting the user input when the representative point for the finger contact is located within the activation region for the respective user-selectable object, performing a predefined operation associated with the respective user-selectable object.

In accordance with some embodiments, an electronic device includes a display, a touch-sensitive surface, one or more processors, memory, and one or more programs. The one or more programs are stored in the memory and configured to be executed by the one or more processors. The one or more programs include instructions for displaying a plurality of user-selectable objects on the display. A respective user-selectable object has a corresponding activation region on the touch-sensitive surface with an activation region size. The activation region size for the respective user-selectable object has a respective default size when a representative point for a finger contact is located outside the activation region for the respective user-selectable object and the representative point for the finger contact is not located in an activation region for a user-selectable object that is adjacent to the respective user-selectable object on the display. The activation region size for the respective user-selectable object has a respective expanded size, larger than the respective default size, when the representative point for the finger contact is located within the activation region for the respective user-selectable object. The activation region size for the respective user-selectable object has a respective reduced size, smaller than the respective default size, when the representative point for the finger contact is located within an activation region for a user-selectable object that is adjacent to the respective user-selectable object on the display. The one or more programs also include instructions for: detecting movement of the finger contact across the touch-sensitive surface; in response to detecting movement of the finger contact across the touch-sensitive surface, changing the size of the activation region for the respective user-selectable object between the respective default size, the respective expanded size, and the respective reduced size in accordance with the movement of the finger contact; detecting a user input when the representative point for the finger contact is located within the activation region for the respective user-selectable object; and, in response to detecting the user input when the representative point for the finger contact is located within the activation region for the respective user-selectable object, performing a predefined operation associated with the respective user-selectable object.

In accordance with some embodiments, a computer readable storage medium has stored therein instructions which when executed by an electronic device with a display and a touch-sensitive surface, cause the device to display a plurality of user-selectable objects on the display. A respective user-selectable object has a corresponding activation region on the touch-sensitive surface with an activation region size. The activation region size for the respective user-selectable object has a respective default size when a representative point for a finger contact is located outside the activation region for the respective user-selectable object and the representative point for the finger contact is not located in an activation region for a user-selectable object that is adjacent to the respective user-selectable object on the display. The activation region size for the respective user-selectable object has a respective expanded size, larger than the respective default size, when the representative point for the finger contact is located within the activation region for the respective user-selectable object. The activation region size for the respective user-selectable object has a respective reduced size, smaller than the respective default size, when the representative point for the finger contact is located within an activation region for a user-selectable object that is adjacent to the respective user-selectable object on the display. The instructions also cause the device to: detect movement of the finger contact across the touch-sensitive surface; in response to detecting movement of the finger contact across the touch-sensitive surface, change the size of the activation region for the respective user-selectable object between the respective default size, the respective expanded size, and the respective reduced size in accordance with the movement of the finger contact; detect a user input when the representative point for the finger contact is located within the activation region for the respective user-selectable object; and, in response to detecting the user input when the representative point for the finger contact is located within the activation region for the respective user-selectable object, perform a predefined operation associated with the respective user-selectable object.

In accordance with some embodiments, a graphical user interface on an electronic device with a display, a touch-sensitive surface, a memory, and one or more processors to execute one or more programs stored in the memory includes a first plurality of user-selectable objects on the display. A respective user-selectable object has a corresponding activation region on the touch-sensitive surface with an activation region size; the activation region size for the respective user-selectable object has a respective default size when a representative point for a finger contact is located outside the activation region for the respective user-selectable object and the representative point for the finger contact is not located in an activation region for a user-selectable object that is adjacent to the respective user-selectable object on the display. The activation region size for the respective user-selectable object has a respective expanded size, larger than the respective default size, when the representative point for the finger contact is located within the activation region for the respective user-selectable object. The activation region size for the respective user-selectable object has a respective reduced size, smaller than the respective default size, when the representative point for the finger contact is located within an activation region for a user-selectable object that is adjacent to the respective user-selectable object on the display. Movement of the finger contact across the touch-sensitive surface is detected. In response to detecting movement of the finger contact across the touch-sensitive surface, the size of the activation region for the respective user-selectable object is changed between the respective default size, the respective expanded size, and the respective reduced size in accordance with the movement of the finger contact. A user input is detected when the representative point for the finger contact is located within the activation region for the respective user-selectable object. In response to detecting the user input when the representative point for the finger contact is located within the activation region for the respective user-selectable object, a predefined operation associated with the respective user-selectable object is performed.

In accordance with some embodiments, an electronic device includes: a display; a touch-sensitive surface; means for displaying a plurality of user-selectable objects on the display, wherein: a respective user-selectable object has a corresponding activation region on the touch-sensitive surface with an activation region size; the activation region size for the respective user-selectable object has a respective default size when a representative point for a finger contact is located outside the activation region for the respective user-selectable object and the representative point for the finger contact is not located in an activation region for a user-selectable object that is adjacent to the respective user-selectable object on the display; the activation region size for the respective user-selectable object has a respective expanded size, larger than the respective default size, when the representative point for the finger contact is located within the activation region for the respective user-selectable object; and, the activation region size for the respective user-selectable object has a respective reduced size, smaller than the respective default size, when the representative point for the finger contact is located within an activation region for a user-selectable object that is adjacent to the respective user-selectable object on the display; means for detecting movement of the finger contact across the touch-sensitive surface; in response to detecting movement of the finger contact across the touch-sensitive surface, means for changing the size of the activation region for the respective user-selectable object between the respective default size, the respective expanded size, and the respective reduced size in accordance with the movement of the finger contact; means for detecting a user input when the representative point for the finger contact is located within the activation region for the respective user-selectable object; and, in response to detecting the user input when the representative point for the finger contact is located within the activation region for the respective user-selectable object, means for performing a predefined operation associated with the respective user-selectable object.

In accordance with some embodiments, an information processing apparatus for use in an electronic device with a display and a touch-sensitive surface includes: means for displaying a plurality of user-selectable objects on the display, wherein: a respective user-selectable object has a corresponding activation region on the touch-sensitive surface with an activation region size; the activation region size for the respective user-selectable object has a respective default size when a representative point for a finger contact is located outside the activation region for the respective user-selectable object and the representative point for the finger contact is not located in an activation region for a user-selectable object that is adjacent to the respective user-selectable object on the display; the activation region size for the respective user-selectable object has a respective expanded size, larger than the respective default size, when the representative point for the finger contact is located within the activation region for the respective user-selectable object; and, the activation region size for the respective user-selectable object has a respective reduced size, smaller than the respective default size, when the representative point for the finger contact is located within an activation region for a user-selectable object that is adjacent to the respective user-selectable object on the display; means for detecting movement of the finger contact across the touch-sensitive surface; in response to detecting movement of the finger contact across the touch-sensitive surface, means for changing the size of the activation region for the respective user-selectable object between the respective default size, the respective expanded size, and the respective reduced size in accordance with the movement of the finger contact; means for detecting a user input when the representative point for the finger contact is located within the activation region for the respective user-selectable object; and, in response to detecting the user input when the representative point for the finger contact is located within the activation region for the respective user-selectable object, means for performing a predefined operation associated with the respective user-selectable object.

Thus, electronic devices with displays and touch-sensitive surfaces are provided with new and improved accessibility methods and user interfaces, thereby increasing the effectiveness, efficiency, and user satisfaction with such devices. Such methods and interfaces may complement or replace existing accessibility methods.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 7A-7C are flow diagrams illustrating a method of dynamically adjusting the size of an activation region for an object as a finger contact moves in accordance with some embodiments.

FIGS. 8A-8D are flow diagrams illustrating a method of dynamically adjusting the size of an activation region for an object as a finger contact moves in accordance with some embodiments.

DESCRIPTION OF EMBODIMENTS

Figure 1A:
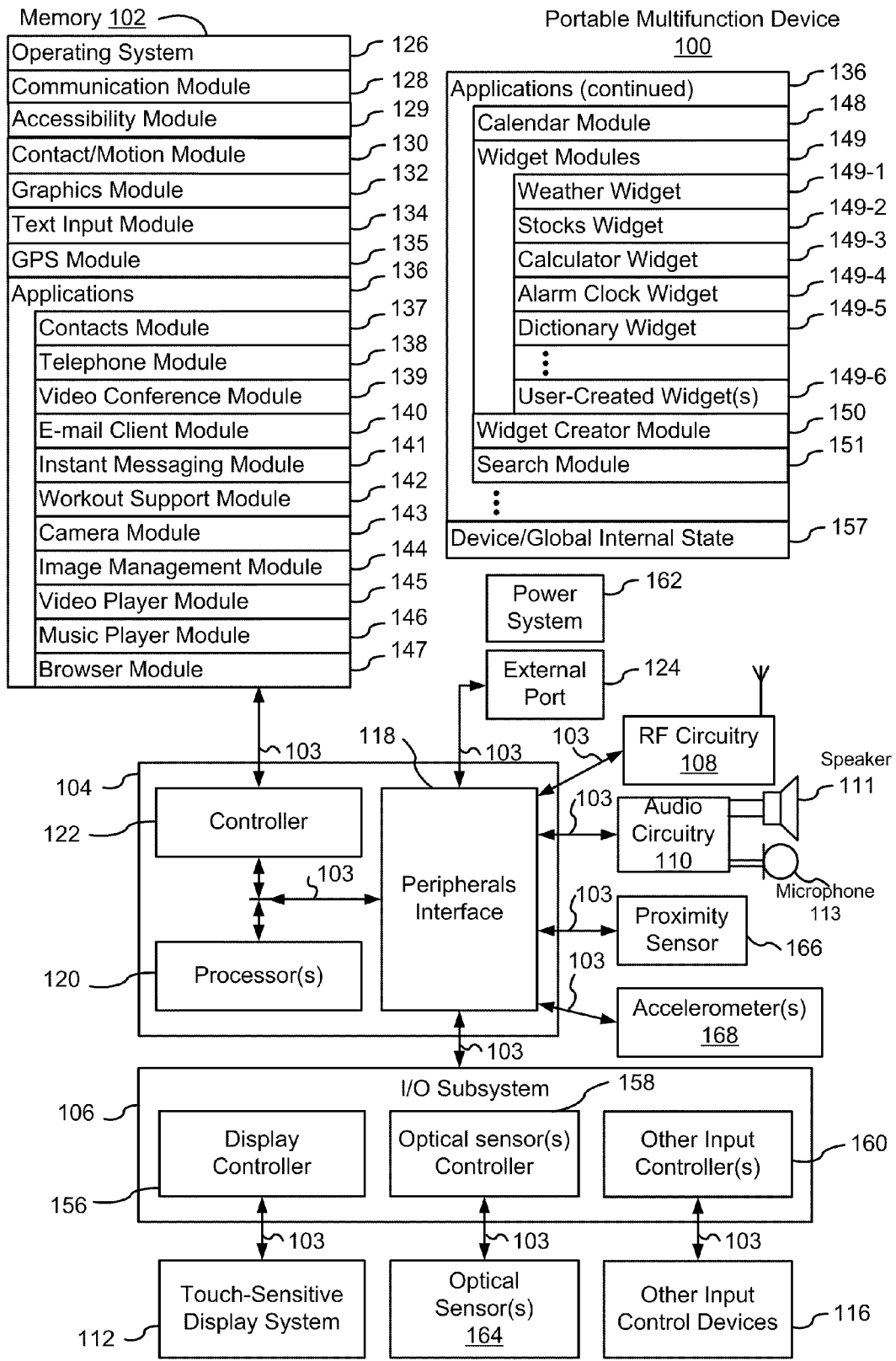
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "resolution" of a display refers to the number of pixels (also called "pixel counts" or "pixel resolution") along each axis or in each dimension of the display. For example, a display may have a resolution of 320×480 pixels. Furthermore, as used herein, the term "resolution" of a multifunction device refers to the resolution of a display in the multifunction device. The term "resolution" does not imply any limitations on the size of each pixel or the spacing of pixels. For example, compared to a first display with a 1024×768-pixel resolution, a second display with a 320×480-pixel resolution has a lower resolution. However, it should be noted that the physical size of a display depends not only on the pixel resolution, but also on many other factors, including the pixel size and the spacing of pixels. Therefore, the first display may have the same, smaller, or larger physical size, compared to the second display.

As used herein, the term "video resolution" of a display refers to the density of pixels along each axis or in each dimension of the display. The video resolution is often measured in a dots-per-inch (DPI) unit, which counts the number of pixels that can be placed in a line within the span of one inch along a respective dimension of the display.

Embodiments of computing devices, user interfaces for such devices, and associated processes for using such devices are described. In some embodiments, the computing device is a portable communications device, such as a mobile telephone, that also contains other functions, such as PDA and/or music player functions. Exemplary embodiments of portable multifunction devices include, without limitation, the iPhone®, iPod Touch® and iPad® devices from Apple Inc. of Cupertino, Calif. Other portable devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

Other portable devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entireties. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
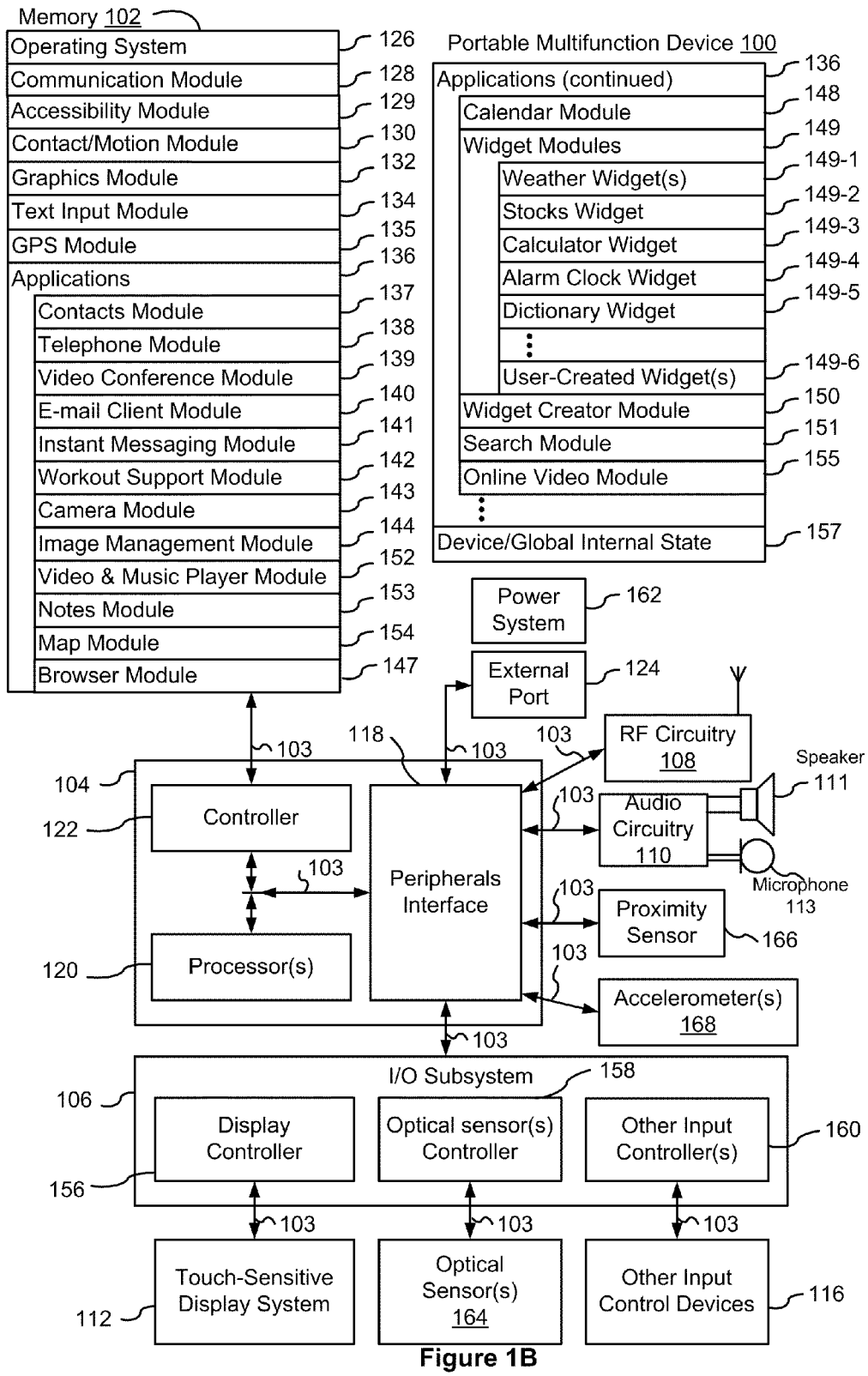

Attention is now directed toward embodiments of portable devices with touch-sensitive displays. FIGS. 1A and 1B are block diagrams illustrating portable multifunction devices 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS)), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2). A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No.: 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from portable device 100, whereas touch sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

In some embodiments, device 100 may include a physical or virtual wheel (e.g., a click wheel) as input control device 116. A user may navigate among and interact with one or more graphical objects (e.g., icons) displayed in touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by input controller 160 as well as one or more of the modules and/or sets of instructions in memory 102. For a virtual click wheel, the click wheel and click wheel controller may be part of touch screen 112 and display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIGS. 1A and 1B show an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 may also include one or more proximity sensors 166. FIGS. 1A and 1B show proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No.11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 may also include one or more accelerometers 168. FIGS. 1A and 1B show accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
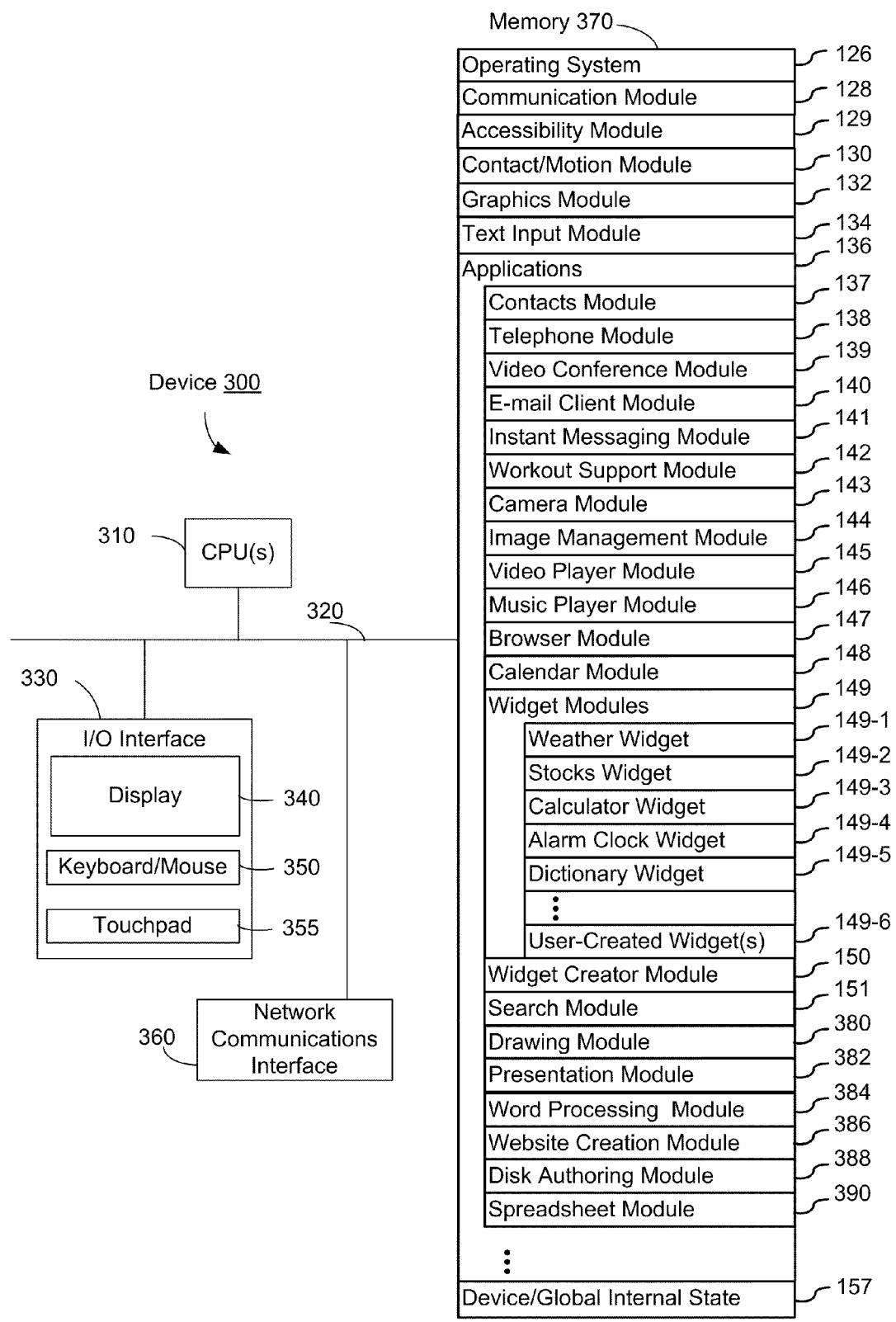
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, an accessibility module (or set of instructions) 129, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A, 1B and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

In conjunction with audio circuitry 110, speaker 111, touch screen 112, display controller 156, contact module 130, graphics module 132, and text input module 134, accessibility module 129 facilitates touch-based navigation among user interface elements so that a user may navigate, select, activate, and otherwise interact with elements in the user interface without necessarily seeing the user interface. In some embodiments, accessibility module 129 includes a text to speech module for converting text strings to audible speech. In other embodiments, the text to speech module is separate from accessibility module 129. In some embodiments, the accessibility module 129 facilitates selecting and activating user interface elements within the user interface without directly selecting or contacting those user interface elements. Exemplary user interface elements include, without limitation, user interface icons and widgets, application icons, application interfaces, menus, web browsers, web pages and applications from the world-wide web, application controls, documents, soft/virtual keyboards and numeric pads, calculators, calendars, lists, tables, emails, HTML text, XML text, rich text, unformatted text, maps, game interfaces, etc. User interface elements include any aspect of a graphical or textual user interface that a user may interact with or manipulate when using an electronic device the user interface is running on.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detects contact on a touchpad. In some embodiments, contact/motion module 130 and controller 160 detects contact on a click wheel.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
video player module 145;
music player module 146;
browser module 147;
calendar module 148;
widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which merges video player module 145 and music player module 146;
notes module 153;
map module 154; and/or
online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, video player module 145 includes executable instructions to display, present or otherwise play back videos (e.g., on touch screen 112 or on an external, connected display via external port 124).

In conjunction with touch screen 112, display system controller 156, contact module 130, graphics module 132, audio circuitry 110, speaker 111, RF circuitry 108, and browser module 147, music player module 146 includes executable instructions that allow the user to download and play back recorded music and other sound files stored in one or more file formats, such as MP3 or AAC files. In some embodiments, device 100 may include the functionality of an MP3 player, such as an iPod (trademark of Apple Inc.).

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1C:
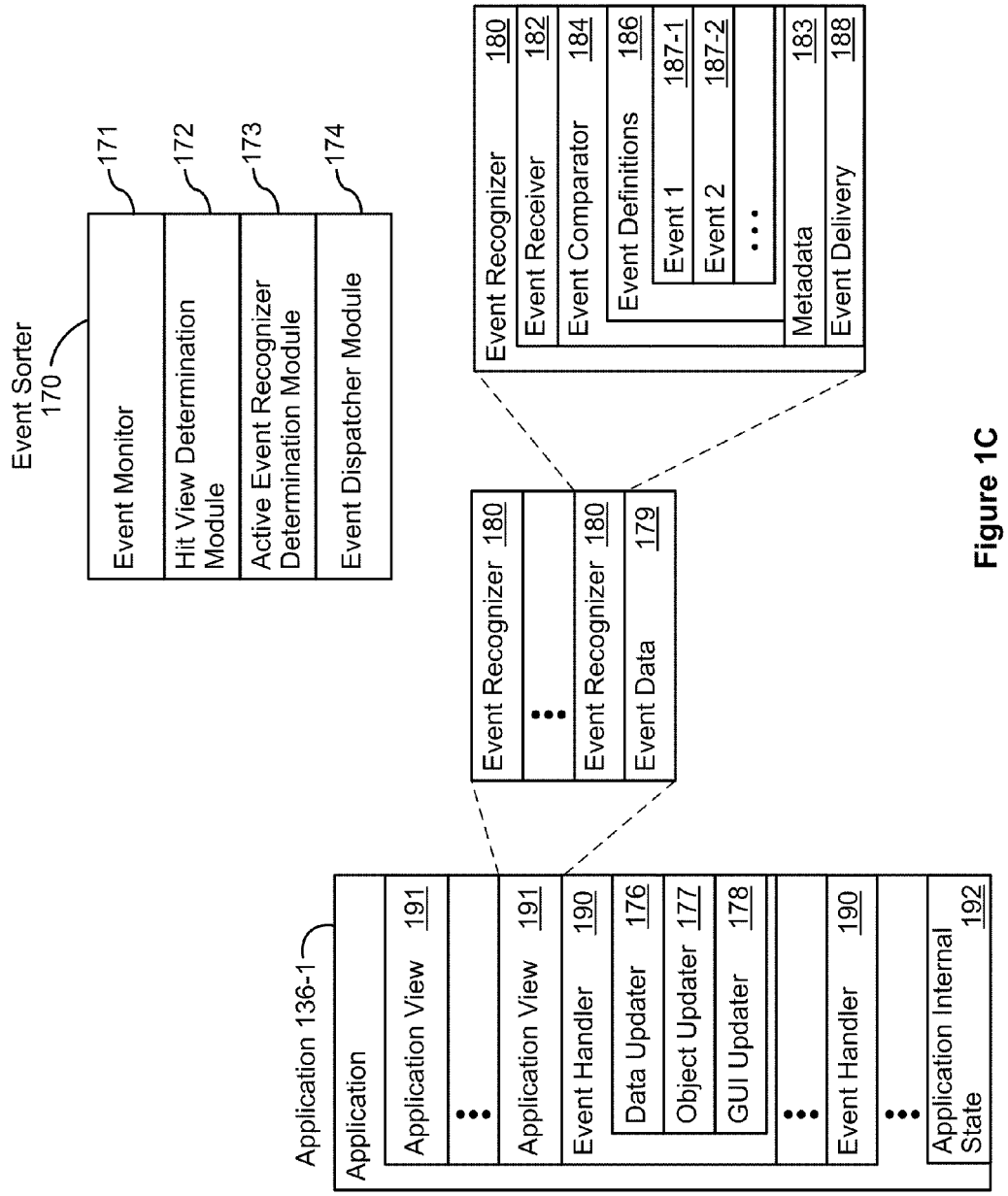
FIG. 1C is a block diagram illustrating exemplary components for event handling in accordance with some embodiments.

FIG. 1C is a block diagram illustrating exemplary components for event handling in accordance with some embodiments. In some embodiments, memory 102 (in FIGS. 1A and 1B) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is(are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
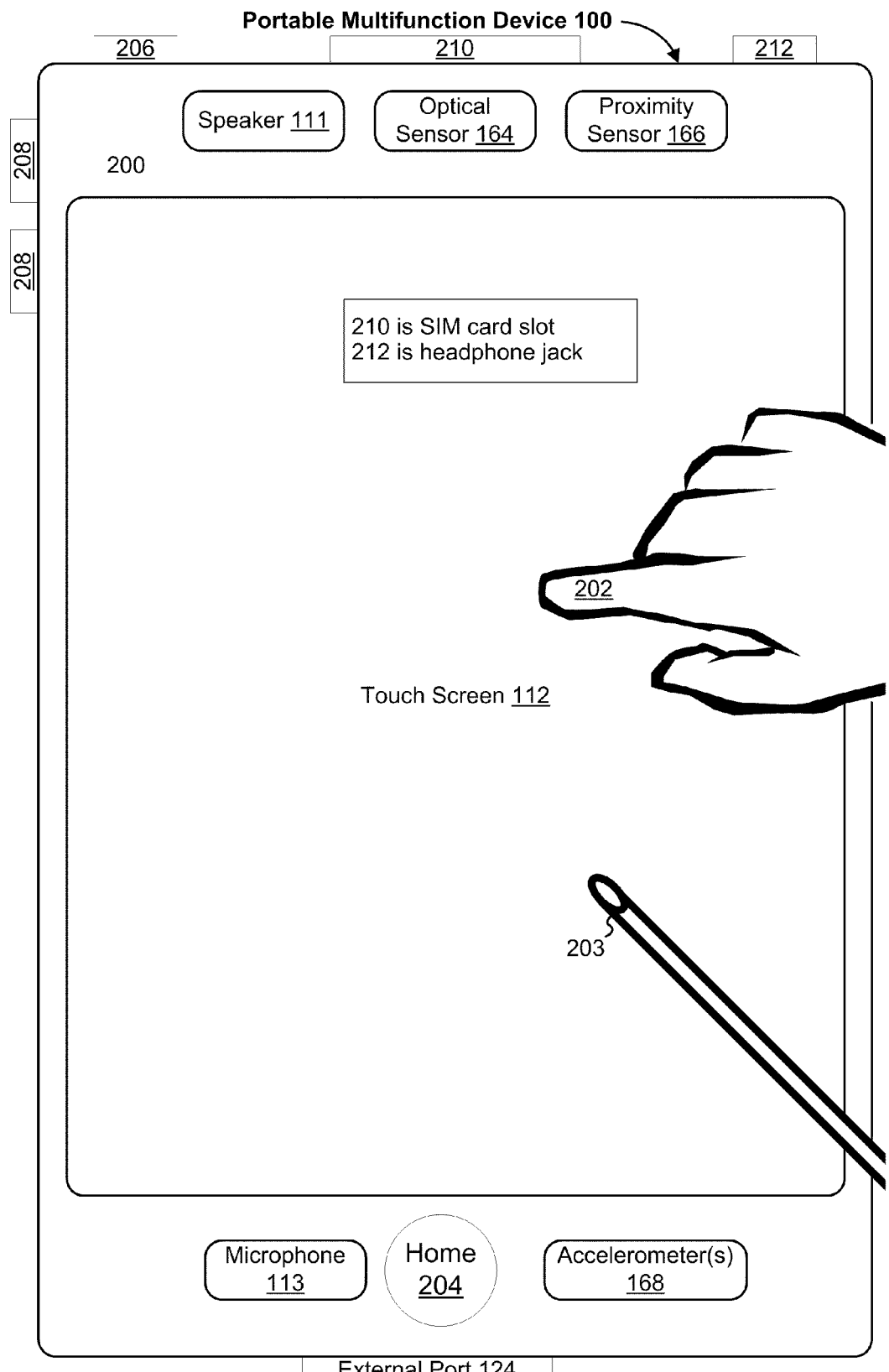
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
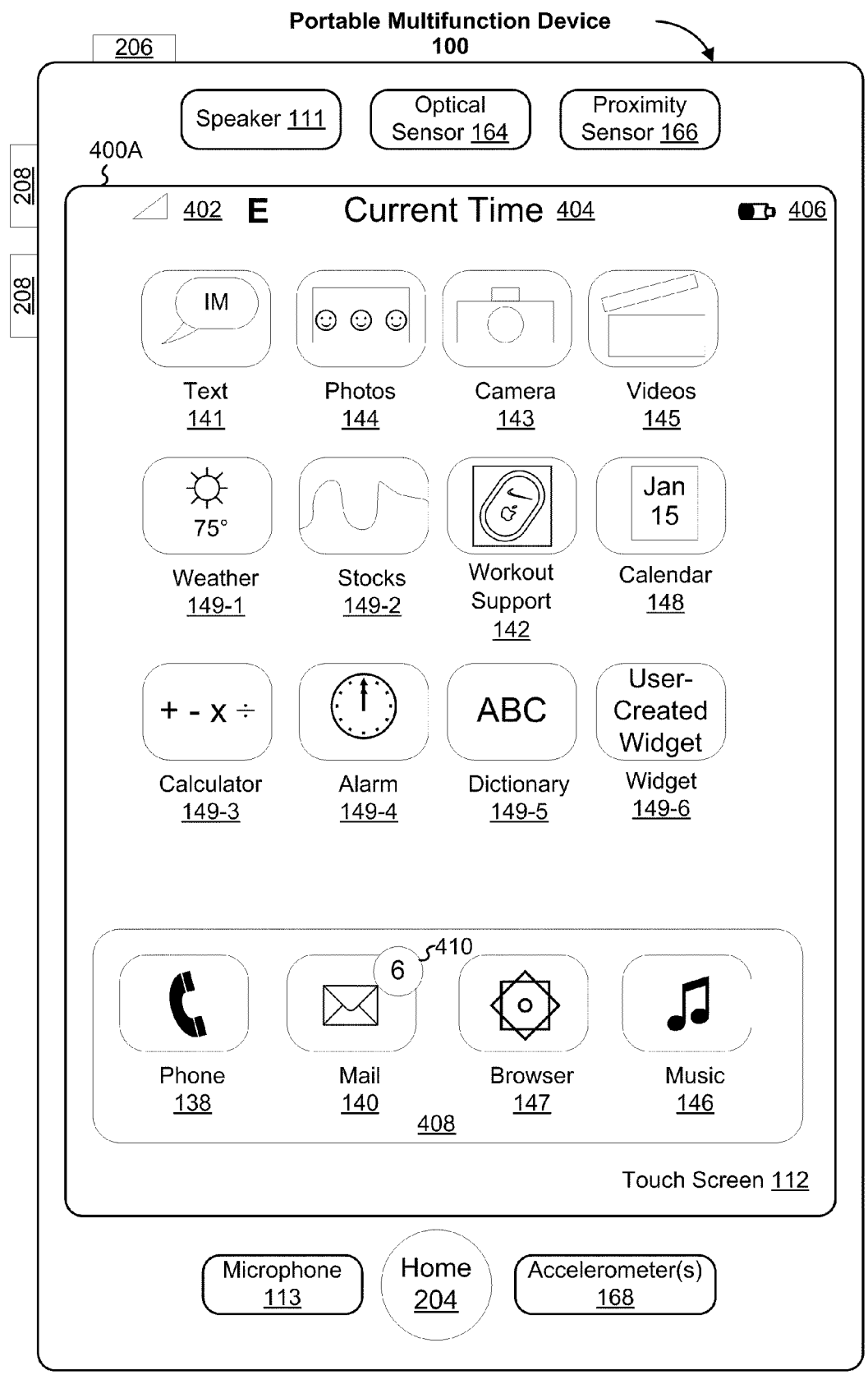
FIGS. 4A and 4B illustrate exemplary user interfaces for a menu of applications on a portable multifunction device in accordance with some embodiments.
Figure 4B:
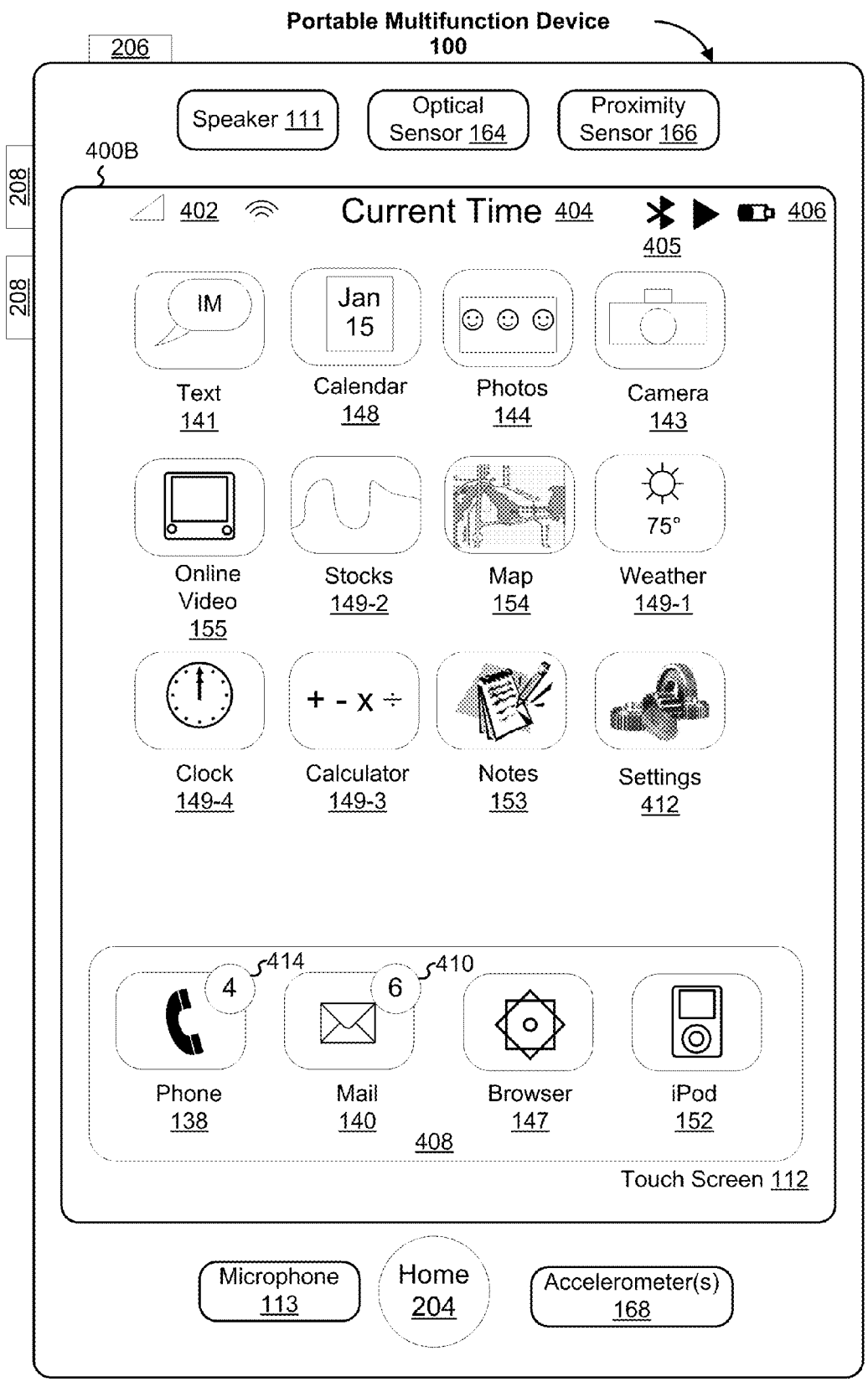

FIGS. 4A and 4B illustrate exemplary user interfaces for a menu of applications on portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
    Phone 138, which may include an indicator 414 of the number of missed calls or voicemail messages;
    E-mail client 140, which may include an indicator 410 of the number of unread e-mails;
    Browser 147; and
    Music player 146; and
Icons for other applications, such as:
    IM 141;
    Image management 144;
    Camera 143;
    Video player 145;
    Weather 149-1;
    Stocks 149-2;
    Workout support 142;
    Calendar 148;
    Calculator 149-3;
    Alarm clock 149-4;
    Dictionary 149-5; and
    User-created widget 149-6.

In some embodiments, user interface 400B includes the following elements, or a subset or superset thereof:

402, 404, 405, 406, 141, 148, 144, 143, 149-3, 149-2, 149-1, 149-4, 410, 414, 138, 140, and 147, as described above;
Map 154;
Notes 153;
Settings 412, which provides access to settings for device 100 and its various applications 136, as described further below;
Video and music player module 152, also referred to as iPod (trademark of Apple Inc.) module 152; and
Online video module 155, also referred to as YouTube (trademark of Google Inc.) module 155.

Figure 4C:
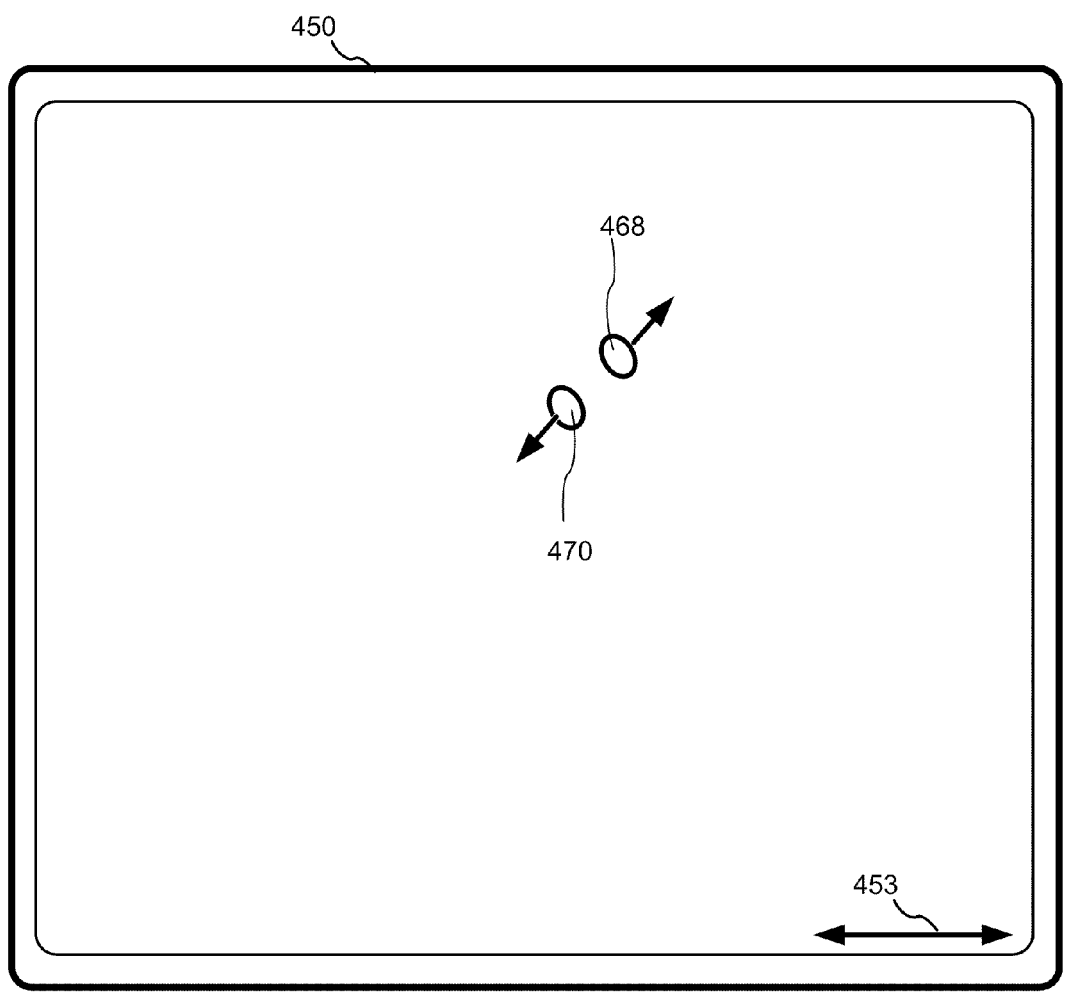
FIG. 4C illustrates an exemplary user interface for a multifunction device with a touch-sensitive surface that is separate from the display in accordance with some embodiments.
Figure 4C:
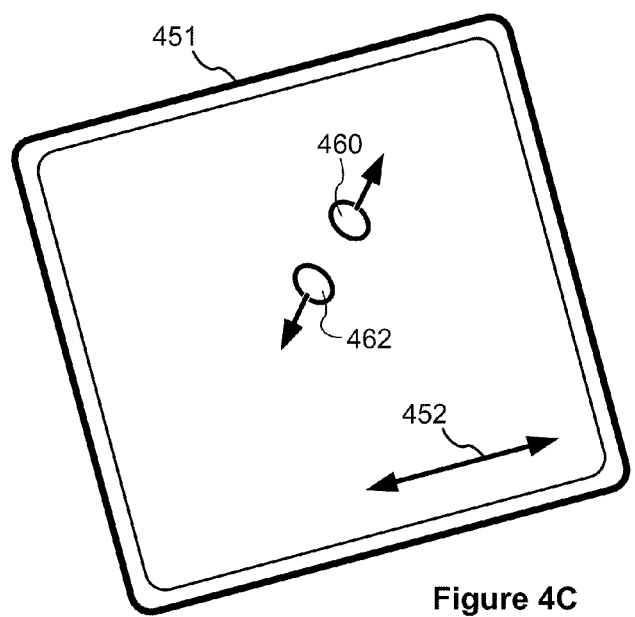

FIG. 4C illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4C. In some embodiments the touch sensitive surface (e.g., 451 in FIG. 4C) has a primary axis (e.g., 452 in FIG. 4C) that corresponds to a primary axis (e.g., 453 in FIG. 4C) on the display (e.g., 450). In accordance with these embodiments, the device detects contacts (e.g., 460 and 462 in FIG. 4C) with the touch-sensitive surface 451 at locations that correspond to respective locations on the display (e.g., in FIG. 4C 460 corresponds to 468 and 462 corresponds to 470). In this way, user inputs (e.g., contacts 460 and 462, and movements thereof) detected by the device on the touch-sensitive surface (e.g., 451 in FIG. 4C) are used by the device to manipulate the user interface on the display (e.g., 450 in FIG. 4C) of the multifunction device when the touch-sensitive surface is separate from the display. It should be understood that similar methods may be used for other user interfaces described herein.

Attention is now directed towards embodiments of user interfaces ("UI") and associated processes that may be implemented on an electronic device with a display and a touch-sensitive surface, such as device 300 or portable multifunction device 100.

Figure 5A:
FIGS. 5A-5U illustrate exemplary user interfaces for interpreting different types of user input via a touch-sensitive surface in accordance with some embodiments.

FIGS. 5A-5U illustrate exemplary user interfaces for interpreting different types of finger input via a touch-sensitive surface in accordance with some embodiments. The user interfaces in these figures are used to illustrate the processes described below, including the processes in FIGS. 6A-6E, 7A-7C, and 8A-8D.

FIG. 5A depicts a user interface 500A of a portable multifunction device for composing a new electronic message. The user interface 500A includes a "To:" field 502 for listing the recipient of this new message, an Add icon 504 for adding more recipients to the "To:" field 502, and a Cancel icon 506 for terminating the preparation of the new message. The user interface 500A also includes a virtual keyboard 508 that is comprised of alphanumeric key icons and other special key icons. Next to the virtual keyboard 508 are a textbox 510 for displaying the content of a new message and a Send icon 512. A user selection of the Send icon 512 causes the new message to be sent to the respective message recipients in the "To:" field 502. Note that the virtual keyboard 508 includes key icons of different sizes. The 26-character key icons such as the "R"-letter key icon 514-A are approximately the same size whereas the shift key icon 514-B and the backspace key icon 514-C are slightly bigger than the character key icons. The other special key icons such as the number-character keyboard switching icon 518, the space key icon 516, and the return key icon 520 are also bigger than the character key icons. To highlight the effect of a user interaction with the virtual keyboard 508, only a subset of the entire virtual keyboard 508 is shown in FIGS. 5B-5U, respectively.

Figure 5B:
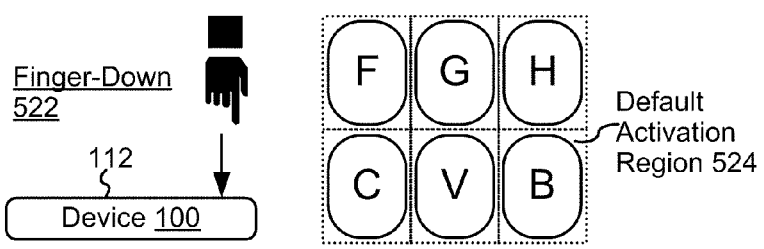

FIGS. 5B-5L represent different moments in time when a group of six adjacent character key icons, which are part of the virtual keyboard 508, receive two consecutive finger contact interactions from a user. In particular, FIG. 5B depicts the moment ($t=t_a$) at which a user's finger is approaching the touch-sensitive surface 112 of the multifunction device 100. FIG. 5B illustrates that the finger is coming down 522 within a group of six adjacent character key icons that are part of the virtual keyboard 508. Each of the six key icons is inside its own dashed-line box. Each dashed-line box represents a default activation region 524 for the corresponding key icon. The default activation region 524 is used for determining whether the corresponding key icon should be activated or not based on the user interaction with the touch-sensitive surface 112. For illustrative purposes, the default activation region 524 is shown to be larger than the corresponding key icon. It will be apparent to those of ordinary skill in the art that this size difference is optional. For example, the default activation region of a key icon may have substantially the same size as the corresponding key icon on the touch-sensitive surface 112 or may be smaller than the corresponding key icon in some other embodiments. Note that the terms "activation" or "activated" are used herein for describing that the device has associated a user interface object such as a virtual key icon on the touch-sensitive surface with a user input such as a finger contact and the device is ready to perform one or more operations associated with the user interface object. In other words, the activation of a user interface object in response to a finger contact is similar to detecting a mouse button-down on a user interface object. The user interface object may be "selected"

by the user if a termination of the finger contact at the "activated" user interface object is detected, which is similar to detecting a mouse button-up on the same user interface object.

Figure 5C:
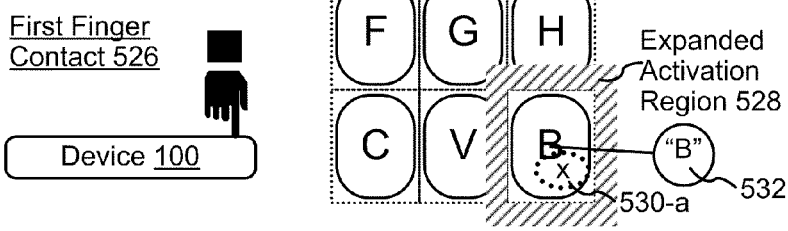

FIG. 5C depicts the moment (t=t$_b$) at which the user has established a first finger contact 526 with the touch-sensitive surface 112. As shown in FIG. 5C, a representative point 530 for the first finger contact 526 (e.g., the centroid of the finger contact or another point within the touch area of the finger contact) occurs within the default activation region of the key icon for the letter "B." In response to detecting the first finger contact 526 (or its representative point 530) within the default activation region 524 for a key icon, the device 100 may perform one or more of the following operations: (i) generate an expanded activation region 528 for the same key icon; and (ii) initiate an output of audible (or visible or both in some cases) accessibility information associated with the key icon. Note that while the activation regions (e.g., 524 and 528) are shown in the figures, these regions are typically not displayed to the user. Instead, the user typically sees just the corresponding objects (e.g., icons). In some embodiments, output of the audible accessibility information is initiated by requesting a text to speech module to convert a first string (e.g., the name of the key, such as "B") to speech, and after a pause of predefined length, to convert a second string to speech (e.g., a word corresponding to the key, such as "Boy"). In some implementations, each key of a soft keyboard has metadata or the like that associates a first string and a second string with the key for use by accessibility module 129. The text to speech module reports back to accessibility module 129 upon completion of each text to speech conversion, enabling the accessibility module 129 to determine whether device 100 has output one or more predefined portions of the audible accessibility information associated with a key or other user-selectable object. Thus, when the termination of a finger contact is detected, accessibility module 129 can determine whether device 100 has output at least a predefined portion of the audible accessibility information associated with the key or other user-selectable object.

In some embodiments, the audible accessibility information associated with a character key (e.g., the letter "B") may be just the sound or pronunciation for the character. The device "speaks" the character aloud (e.g., outputting the sound 532 for the letter "B" through speaker 111) when the location of the first finger contact 526 (or its representative point 530) on the touch-sensitive surface corresponds to the location of the "B" key on the display. As another example, the audible accessibility information associated with a character key (e.g., the letter "B") may be the sound for the character plus the use of the character in a word plus a repetition of the sound for the character. The device "speaks" aloud the character, the use of the character in a word, and a repetition of the character (e.g., outputting the sound for "B, . . . Boy, . . . B" through speaker 111) when the location of the first finger contact 526 (or its representative point 530) corresponds to the location of the "B" key on the display.

In some embodiments, one or both operations (i.e., expanding the activation region and outputting audible accessibility information) are performed as soon as the first finger contact 526 is detected within the default activation region 524. In some embodiments, the two operations may be initiated independently at substantially the same time. In some other embodiments, one operation (e.g., the expansion of activation region) is initiated before the other operation (e.g., the output of audible accessibility information).

Figure 5D:
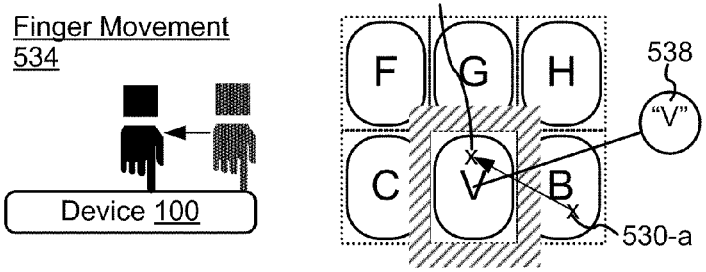

FIG. 5D depicts the moment (t=t$_c$) at which that the first finger contact (and its representative point 530-b) has moved 534 across the touch-sensitive surface outside of the expanded activation region 528 for the "B" key to the "V" key, on its way to the "F" key. Depending on how fast the finger contact is moving, the device outputs all, some, or none of the audible accessibility information 538 for the "V" key.

Figure 5E:
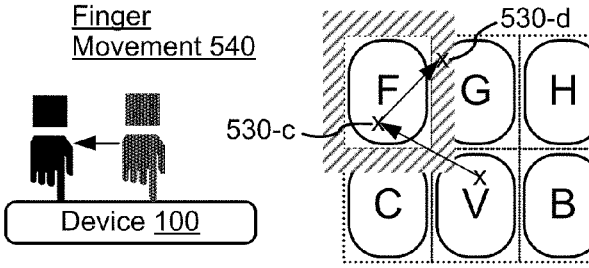

FIG. 5E depicts the moment (t=t$_d$) at which that the first finger contact 526 (and its representative point 530) has left the activation region for the letter "V" and is currently within the default activation region of the key icon for the letter "F" (see, e.g., the representative point 530-c). When the finger contact (or its representative point) is within the default activation region of the key icon for the letter "F," the device 100 generates an expanded activation region for the letter "F" and initiates the output of the audible accessibility information for the letter "F." Note that the expanded activation region helps the device 100 to tolerate unintentional finger contact movement, such as finger-jittering. For example, the device 100 determines that the user means to activate the key icon for the letter "F" even if the finger contact moves from the representative point 530-c to the representative point 530-d, which is outside the default activation region of the key icon for the letter "F" but still within the expanded activation region of the key icon for the letter "F".

Figure 5F:
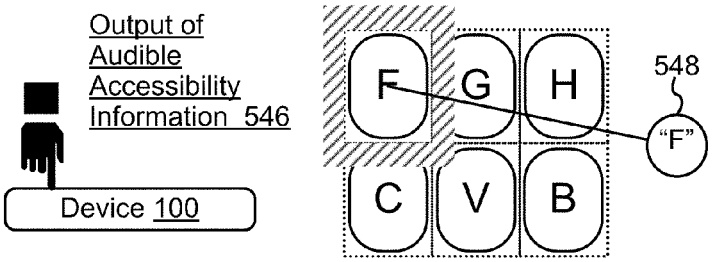

FIG. 5F depicts the moment (t=t$_e$) at which at least a predefined portion of the audible accessibility information associated with the key icon for letter "F" has been output 546 since the output was initiated. In some embodiments, the predefined portion of the audible accessibility information is the pronunciation of the character. In some embodiments, the predefined portion of the audible accessibility information is the pronunciation of some other initial portion of the audible accessibility information. In some embodiments, completion of the predefined portion of the audible accessibility information is marked by a report from the text to speech module, which reports back upon completion of each text to speech conversion.

In some embodiments, a predefined time interval since the output was initiated (e.g., 0.05, 0.1 or 0.2), independent of whether pronunciation of the character has occurred, is used as a criteria to determine whether a character will be selected/entered in response to detecting termination of the finger contact.

Figure 5G:
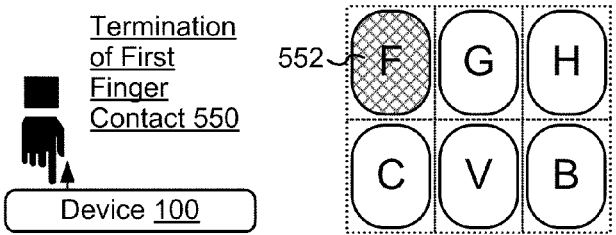

FIG. 5G depicts a subsequent moment (t=t$_f$) at which that the first finger contact 526 with the touch-sensitive surface is terminated 550 and the key icon for the letter "F" is selected so that an instance of the letter "F" is entered into the textbox 512 of FIG. 5A. In some embodiments, the "F" icon is briefly highlighted 552 (or otherwise visually distinguished from the other icons) to indicate that the letter "F" has been selected/entered into the textbox.

Figure 5H:
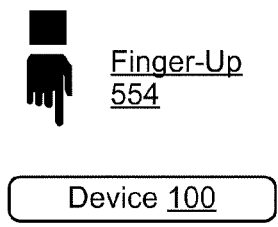
Figure 5H:
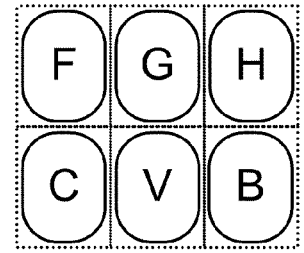

FIG. 5H depicts the moment (t=t$_g$) at which that the finger is further lifted off the touch-sensitive surface and up 554 in the air and all the key icons, including the one for the letter "F," resume their normal appearance.

Figure 5I:
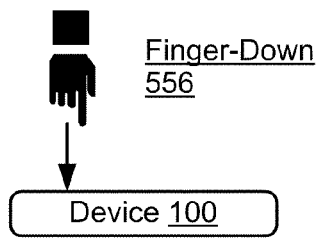
Figure 5I:
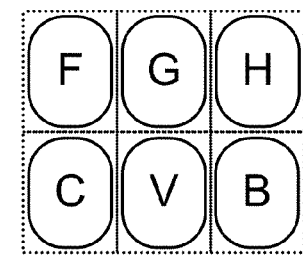
Figure 5J:
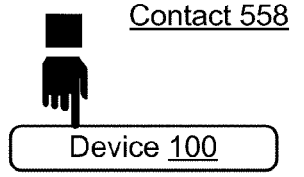
Figure 5J:
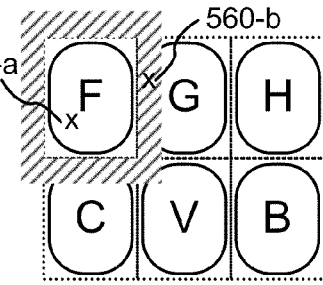

FIGS. 5I and 5J depict the respective moments, (t=t$_h$) and (t=t$_i$), at which that the user's finger is coming down again and has established a second finger contact 558 with the touch-sensitive surface 112 of the device 100. In some embodiments, the second finger contact 558 is treated as completely independent from the first finger contact 526 (FIG. 5C) if a time delay between the termination 550 of the first finger contact and the detection of the second finger contact, i.e., Δt=t$_i$−t$_f$, exceeds a predefined threshold. In this case, the device 100 applies the same set of procedures aforementioned in connection with the first finger contact 526 to the second finger contact 558 to determine which keys are activated or selected.

If, however, the time delay is less than the predefined threshold and the second finger contact 558 (or a representative point 560 for the second finger contact) is found within the activation region of the same key icon at which the first finger contact 526 terminated, the device 100 treats the second finger contact 558 as being related to the first finger contact 526. In some embodiments, the second finger contact 558 is deemed to be related to the first finger contact 526 if the representative point for the second finger contact is within the default activation region of the key icon for the letter "F" (e.g., point 560-a in FIG. 5J). In some other embodiments, the second finger contact 558 is deemed to be related to the first finger contact 526 if the representative point for the second finger contact is within the expanded activation region (which includes the default activation region) of the key icon for the letter "F" (e.g., point 560-b in FIG. 5J).

Figure 5K:
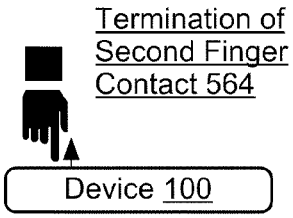
Figure 5K:
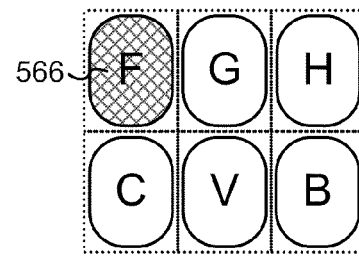

FIG. 5K depicts the moment ($t=t_j$) at which that the second finger contact 558 with the touch-sensitive surface is terminated 564 and the key icon for the letter "F" is selected (and highlighted 566) once again such that a second instance of the letter "F" is entered into the textbox 512 of FIG. 5A. In some embodiments, the key icon for the letter "F" is selected again regardless of whether the device 100 has output at least a predefined portion of the audible accessibility information associated with the key icon for the letter "F" for a second time.

Figure 5L:
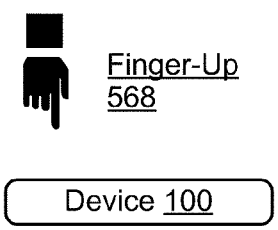
Figure 5L:
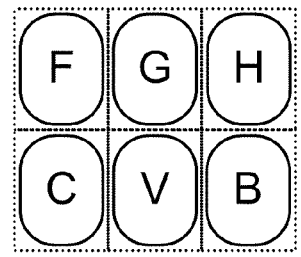

FIG. 5L depicts the moment ($t=t_k$) at which that the finger is once again lifted off the touch-sensitive surface and up 568 in the air and, accordingly, all the key icons resume their normal appearance, as in FIG. 5H. In some embodiments, the device 100 measures a time delay between the terminations of the two finger contacts i.e., $\Delta t = t_j - t_f$, such that the key icon for the letter "F" is selected/entered again if the second finger contact is terminated within a predefined time window after the termination of the first finger contact.

The process described above enables a vision-impaired user to rapidly and accurately select/enter keys just by lifting off a first finger contact (without requiring additional finger gestures), provided that at least a portion of the audible accessibility information for a respective key has been output. In addition, the process described above enables a vision-impaired user to rapidly and accurately repeat selection/entry of the same key just by lifting off a second finger contact (without requiring additional finger gestures), without needing to wait for the audible accessibility information for the same key to be output again.

In some embodiments, the aforementioned process of interpreting the user input through a touch-sensitive surface is applied to a subset of the key icons of the virtual keyboard 508 (e.g., the 26-character or 10-digit key icons) to increase the user input's speed and accuracy for these key icons. For some other icons in the virtual keyboard 508, such as the return key icon 520 shown in FIG. 5A, a different selection process may be used, as described below in connection with FIGS. 5M-5O.

Figure 5M:
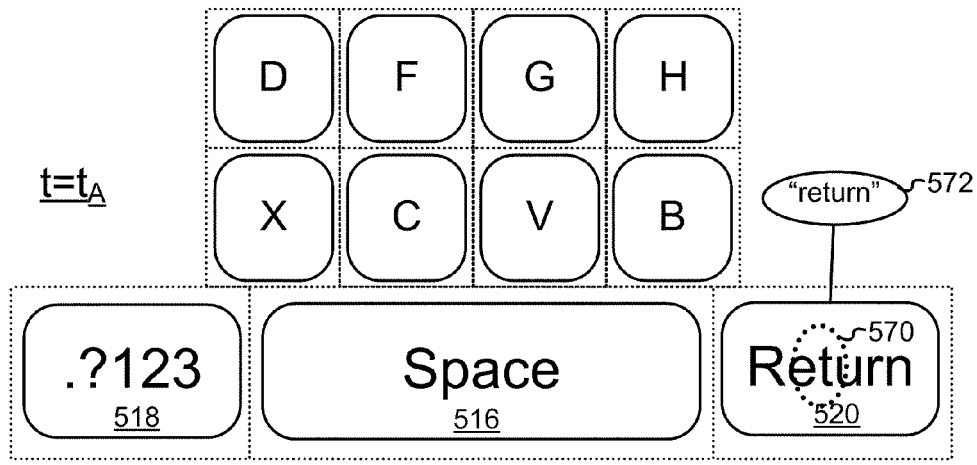

FIG. 5M depicts the moment ($t=t_A$) at which that a first finger contact 570 with the touch-sensitive surface is detected within the activation region of the return key icon 520. For brevity, FIG. 5M does not expressly include the representative point for the finger contact 570 and the expanded activation region for the return key icon 520. After the finger contact 570 is detected, the device 100 initiates the output of audible accessibility information associated with the return key icon 520 (e.g., playing the pronunciation 572 of the word "return"). Unlike the letter key icons described above, the device 100 may not construe a termination of the first finger contact 570 as a user instruction to select the return key icon 520, even after the entire audible accessibility information associated with the return key icon 520 has been output. Instead, as will be explained below, the device 100 may require an additional user input to affirm the user's intent because a misinterpretation of user selection of a special key icon like the return key icon 520 or the send message icon 512 may trigger an operation that is more difficult to correct, such as sending out an unfinished message.

Figure 5N:
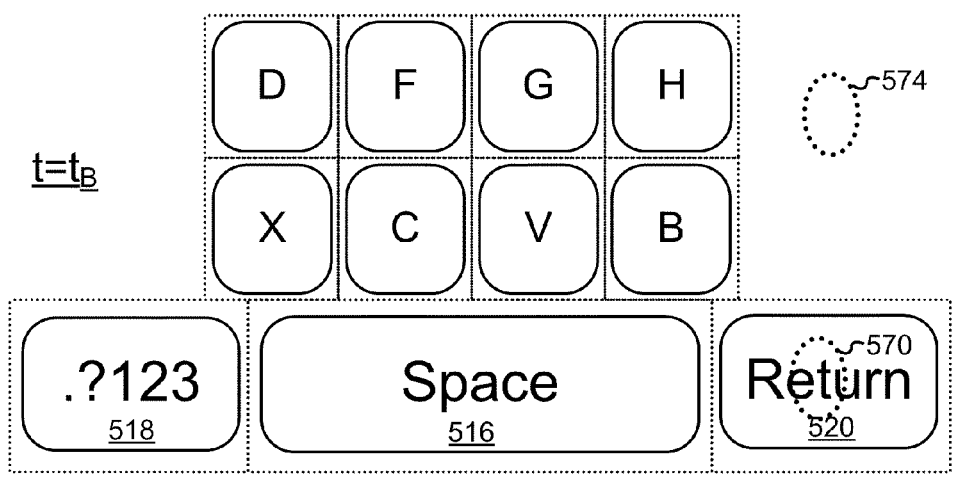

FIG. 5N depicts the moment ($t=t_B$) at which that a second finger contact 574 with the touch-sensitive surface is detected after at least a predefined portion of the audible accessibility information associated with the return key icon 520 has been output. In some embodiments, the second finger contact 574 may occur anywhere on the touch-sensitive surface as long as the first finger contact 570 is still within the activation region of the return key icon 520. In some embodiments, the second finger contact 574 may occur anytime after the first finger contact 570, regardless of whether the device 100 has output any portion of the audible accessibility information associated with the return key icon 520. In this case, the output of the audible accessibility information serves as an indicator of which key icon has been activated but not as a precondition for user selection of the key icon.

Figure 5O:
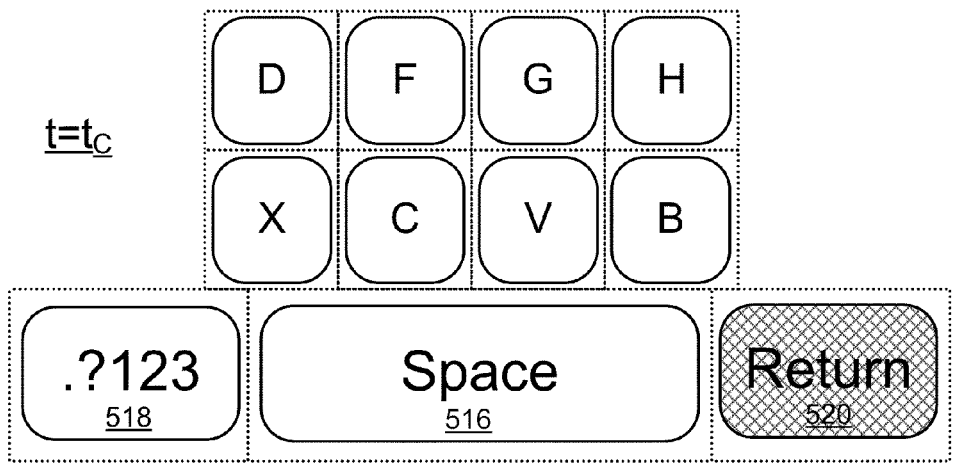
Figure 6A:
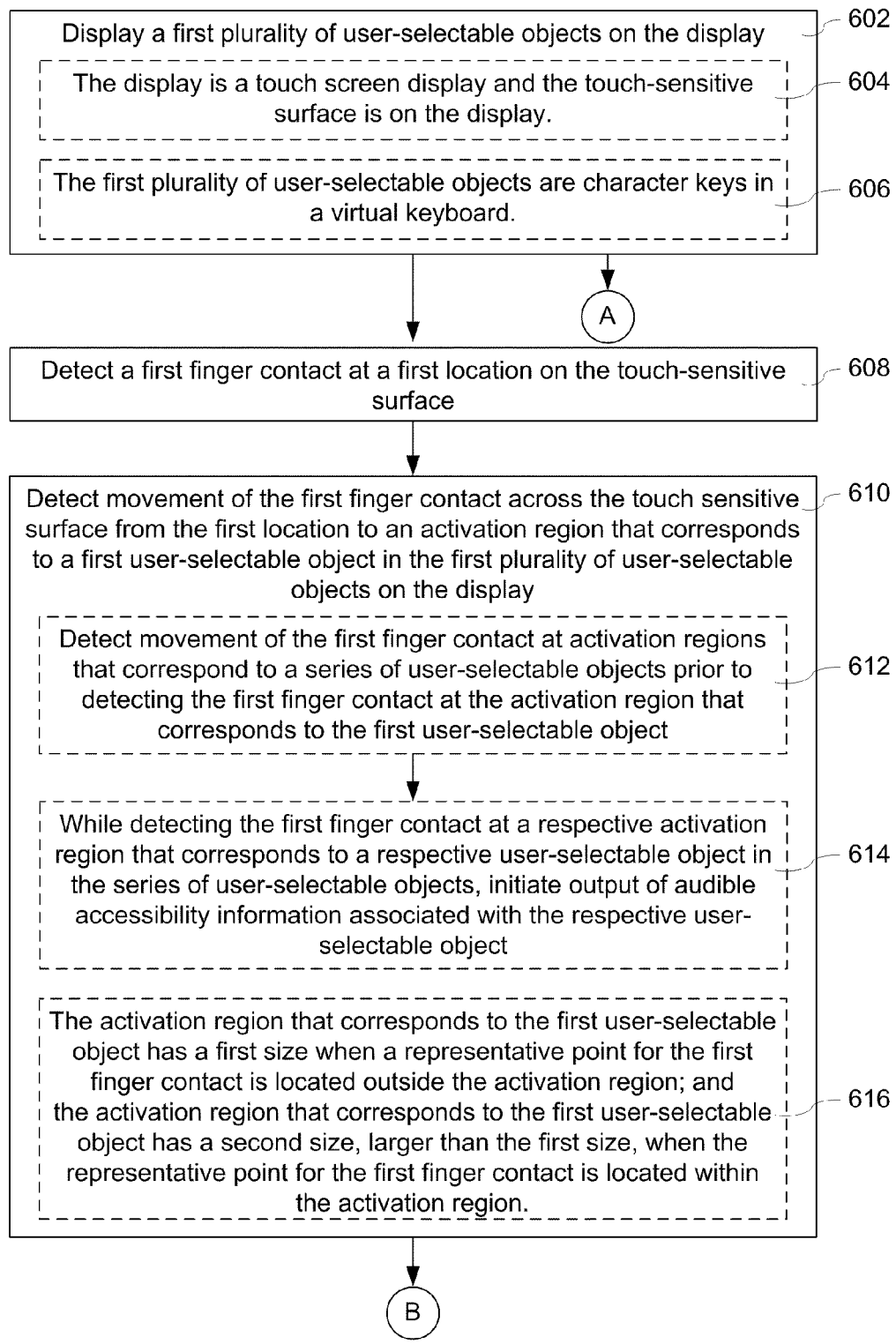
FIGS. 6A-6E are flow diagrams illustrating a method of performing an operation associated with an object in response to termination of a finger contact after output of audible accessibility information for the object in accordance with some embodiments.
Figure 6B:
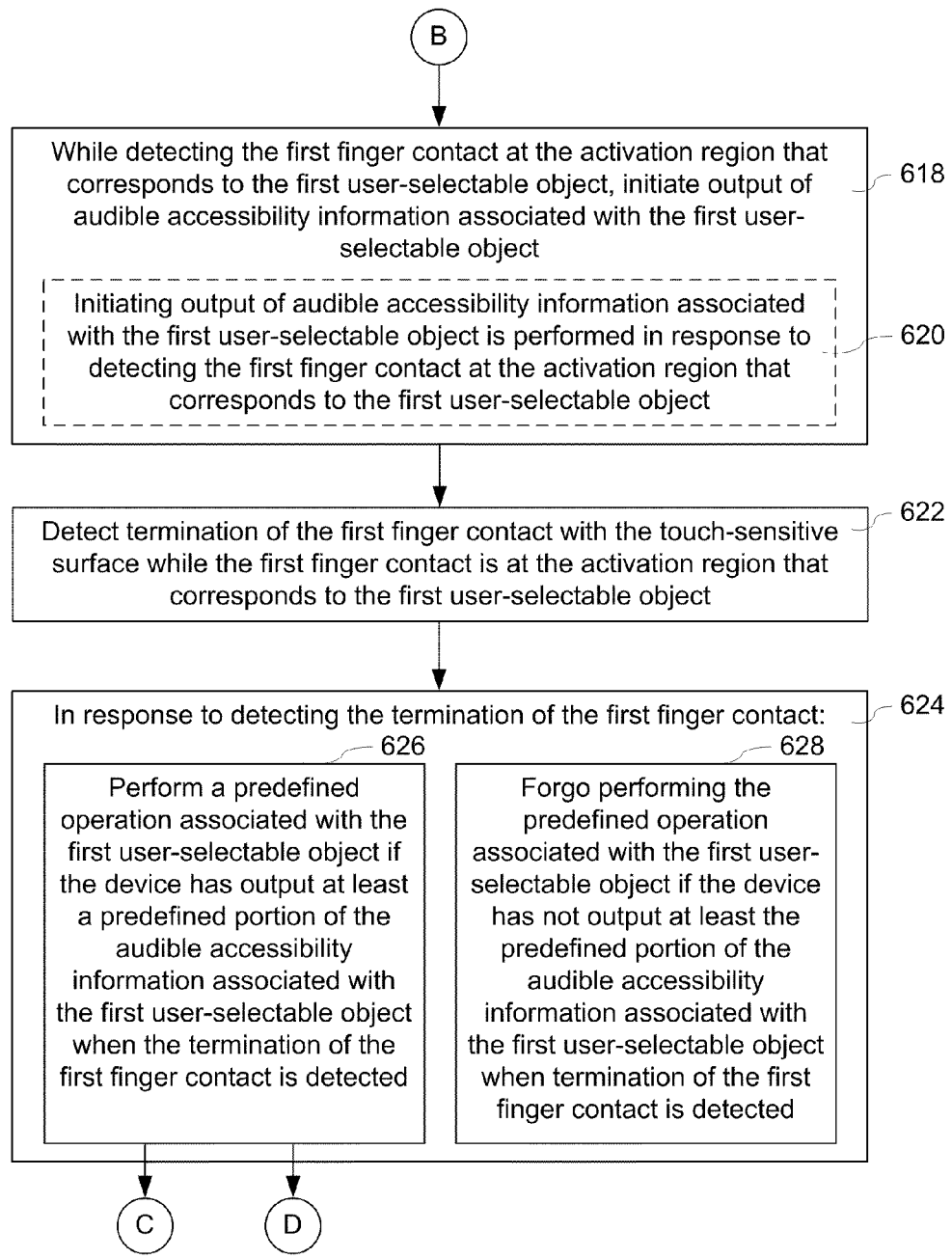
Figure 6C:
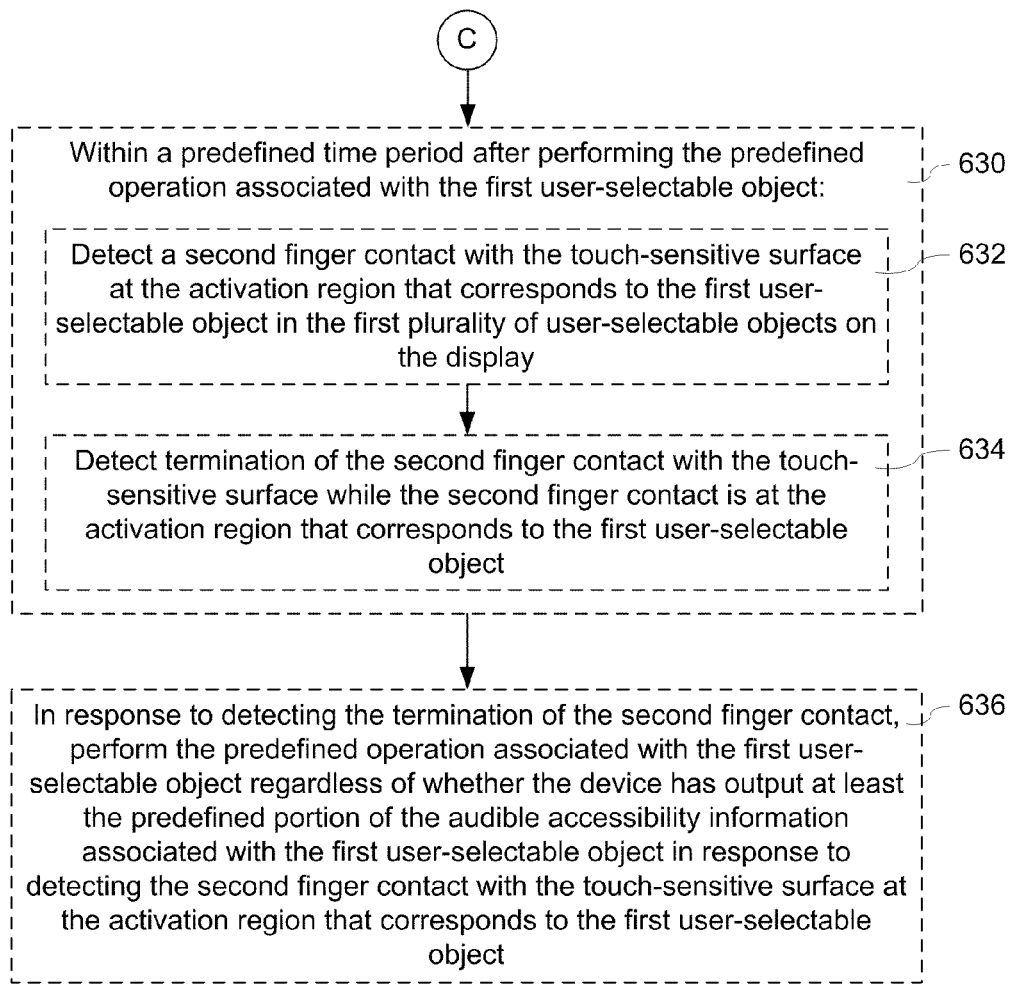
Figure 6D:
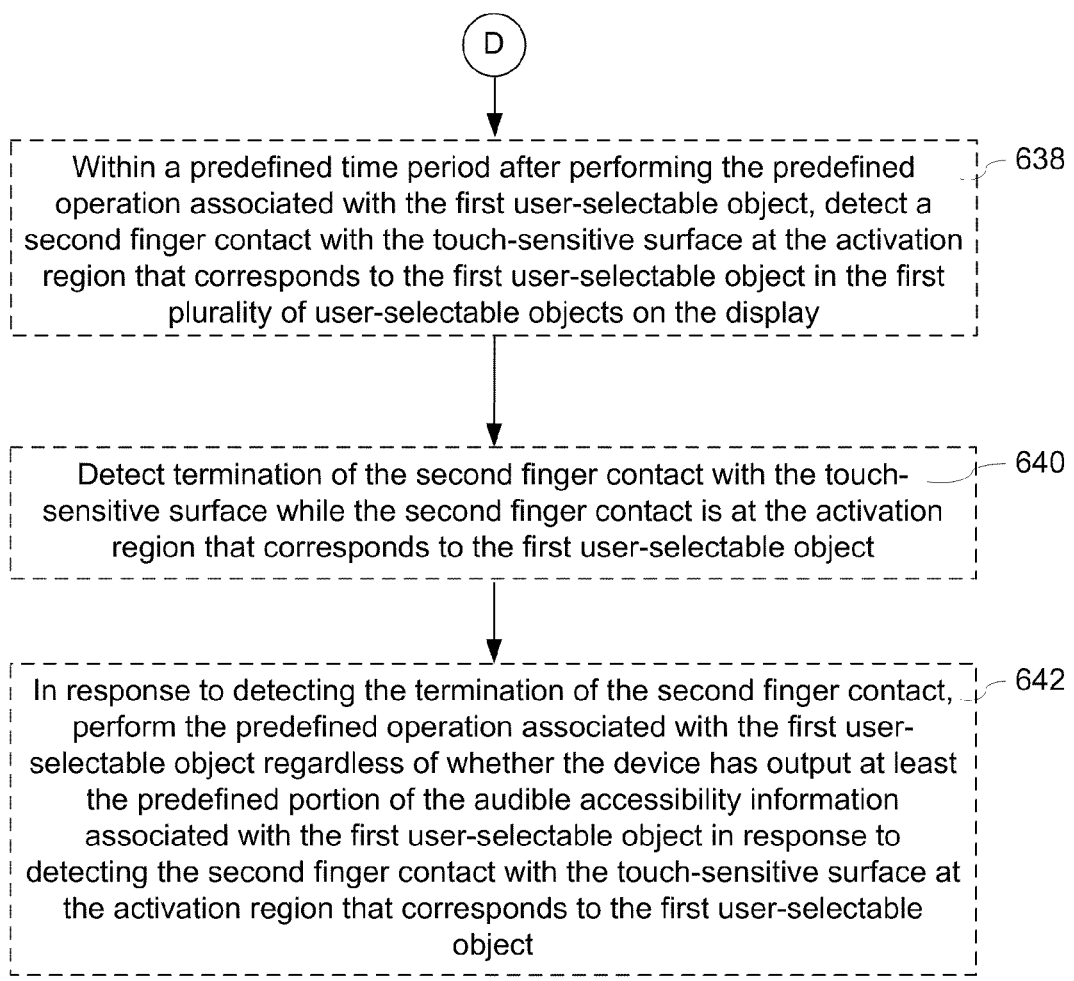
Figure 6E:
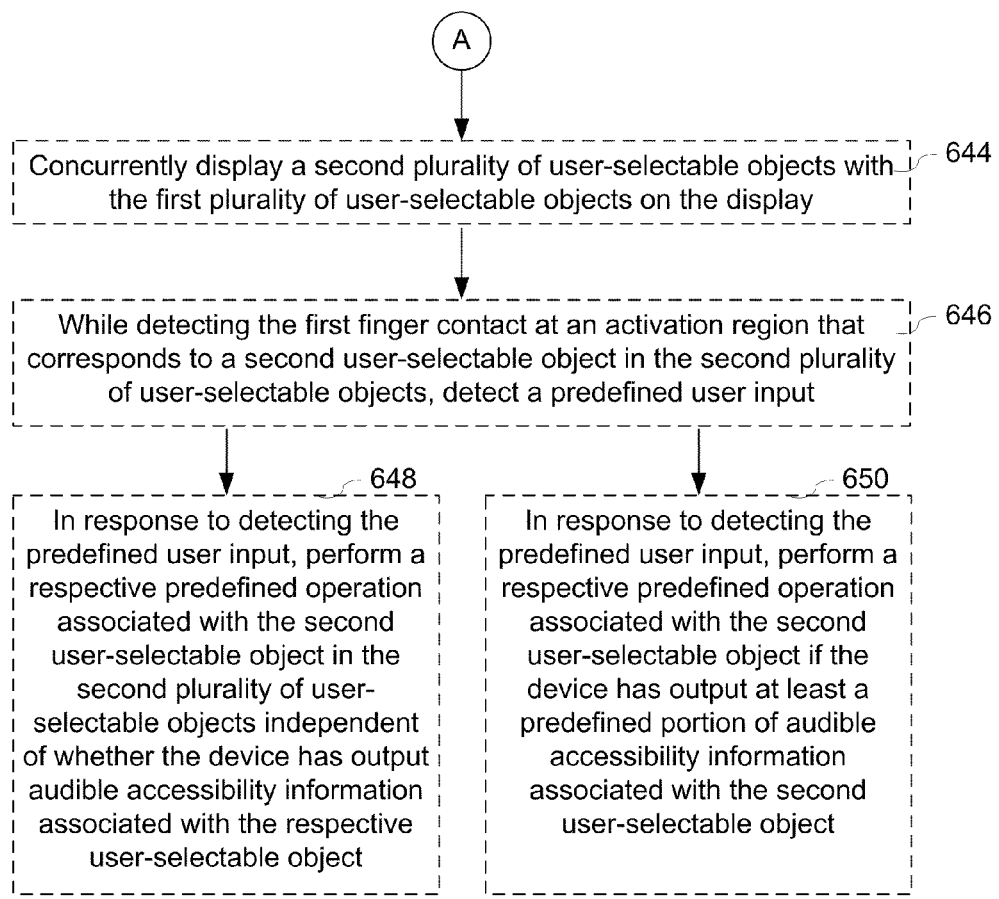

In response to detecting the second finger contact 574 or a gesture made with the second finger contact (e.g., a tap gesture), the device 100 performs a predefined operation associated with the return key icon 520 (e.g., entering a return in the message), as indicated by the highlighting of the return key icon 520 in FIG. 5O. In some embodiments, the second finger contact/gesture may be replaced with another second user input like pressing a physical button (e.g., the home button 204 in FIG. 5A) of the device 100.

FIGS. 5P-5U illustrate dynamically adjusting the size of an activation region for an object as a finger contact moves.

As noted above, a user interface object like the key icon for the letter "B" of the virtual keyboard 508 has a default activation region 524. The user interface object is activated if a user input such as a representative point for a finger contact is found within the object's default activation region 524. After the user interface object is activated, the default activation region may be replaced by the object's expanded activation region 528, which includes the default activation region 524 and which may overlap with the default activation regions of the neighboring key icons. One benefit associated with the expanded activation region 528 is that it can tolerate more finger jitter before an activated object is deactivated. A neighboring user interface object may not be activated if the representative point moves into an overlap region between the two user interface objects. In other words, the neighboring user interface object has a reduced activation region such that it cannot be activated until after the representative point for the finger contact moves out of the expanded activation region of the original user interface object and into the reduced activation region of the neighboring activation region, as described below.

FIG. 5P depicts the moment ($t=t_0$) at which that there is no finger contact with the touch-sensitive surface and each virtual key icon has a default activation region, such as 580-a for the letter "S," 580-b for the letter "D," and 580-c for the letter "F."

FIG. 5Q depicts the subsequent moment ($t=t_1$) at which that there is a finger contact 582 within the default activation region for the letter "D." As a result, the key icon for the letter "D" is activated and has an expanded activation region 584-a. In addition, each of the two neighboring key icons for the letters "S" and "F" has a reduced activation region 586-a and 586-b, respectively. Note that in this embodiment there is no overlap region between the expanded activation region 584-a and any of the reduced activation regions 586-a and 586-b. For simplicity, the figures include only one row of key icons. But it would be apparent to those of ordinary skill in the art that an adjacent key icon in a neighboring row may have a reduced activation region because of the expanded activation region 584-a.

FIG. 5R depicts the subsequent moment ($t=t_2$) at which that the representative point for the finger contact moves from the point 582-a(FIG. 5Q) to the point 582-b. Because the point 582-b is still within the expanded activation region 584-a and outside the reduced activation region 586-b, the key icon for the letter "D" remains activated and the key icon for the letter "F" is not activated, even though the point 582-b is over the "F" key icon.

FIG. 5S depicts the subsequent moment ($t=t_3$) at which that the representative point for the finger contact moves from the point 582-b to the point 582-c. Note that the representative point for the finger contact is now within the reduced activation region 586-b for the letter "F" and outside the expanded activation region 584-a for the letter "D." In response, the "D" key icon becomes deactivated and the "F" key icon becomes activated, as shown in FIG. 5T.

FIG. 5T depicts the subsequent moment ($t=t_4$) at which that the key icon for the letter "F" is activated and has an expanded activation region 584-b. Each of the key icons for the letters "D" and "G" has a reduced activation region 586-c and 586-d, respectively, while each of the key icons for the letters "S" and "H" has a default activation region.

FIG. 5U depicts the subsequent moment ($t=t_5$) at which that the representative point for the finger contact moves from the point 582-c to the point 582-d. Because the point 582-d is still within the expanded activation region 584-b and outside the reduced activation region 586-c, the key icon for the letter "D" is not activated even though the point 582-d is over the "D" key icon.

Dynamically adjusting the size of an activation region for an object as a finger contact moves helps to reduce object activation errors due to finger jitter and enables faster, more accurate input using a touch-sensitive surface. This benefits all types of electronic devices with touch-sensitive surfaces, not just accessible electronic devices for the visually impaired.

FIGS. 6A-6E are flow diagrams illustrating a method 600 of performing an operation associated with an object in response to termination of a finger contact after output of audible accessibility information for the object in accordance with some embodiments. The method 600 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, the method 600 enables a vision-impaired user to rapidly and accurately select objects just by lifting off a first finger contact (without requiring additional finger gestures), provided that at least a portion of the audible accessibility information for the object has been output. The method reduces the cognitive burden on a user with impaired vision when using an electronic device with a display and a touch-sensitive surface, thereby creating a more efficient human-machine interface. For battery-operated computing devices, enabling a user with impaired vision to enter his or her input faster and more efficiently conserves power and increases the time between battery charges.

The device displays (602) a first plurality of user-selectable objects on the display. In some embodiments, the display is a touch screen display and the touch-sensitive surface is on the display (604). In some embodiments, the first plurality of user-selectable objects are character keys in a virtual keyboard (606) (e.g., alphanumeric keys in the virtual keyboard 508 of FIG. 5A).

The device detects (608) a first finger contact at a first location on the touch-sensitive surface. In some embodiments, the first location may correspond to any location besides the location that corresponds to a first user-selectable object, such as another user-selectable object (e.g., another key in a virtual keyboard) or an area with text. For example, FIG. 5C depicts the first finger contact 526 at a location within the activation region of the key icon for the letter "B".

The device detects (610) movement of the first finger contact across the touch-sensitive surface from the first location to an activation region that corresponds to a first user-selectable object in the first plurality of user-selectable objects on the display. In some embodiments, the device detects movement of a point within the first finger contact across the touch-sensitive surface, such as the centroid of the first finger contact or other representative point, and uses the location of this point as the location of the first finger contact. As described above, FIGS. 5C-5E illustrate movement of the first finger contact from the key icon for the letter "B" to the activation region of the key icon for the letter "F."

In some embodiments, the device detects (612) movement of the first finger contact at activation regions that correspond to a series of user-selectable objects (e.g., the key icon for the letter "B" in FIG. 5C and the key icon for the letter "V" in FIG. 5D, etc.) prior to detecting the first finger contact at the activation region that corresponds to the first user-selectable object (e.g., the key icon for the letter "F" in FIG. 5E). While detecting the first finger contact at a respective activation region that corresponds to a respective user-selectable object in the series of user-selectable objects, the device initiates (614) output of audible accessibility information associated with the respective user-selectable object (e.g., the pronunciation 532 of the letter "B" in FIG. 5C and the pronunciation 538 of the letter "V" in FIG. 5D). In some embodiments, the amount of audible accessibility information associated with a respective user-selectable object that is output may depend on how quickly the first finger contact moves between locations that correspond to respective user-selectable objects. For example, if the first finger contact is moving slowly, all of the audible accessibility information associated with a respective user-selectable object may be output. Conversely, if the first finger contact is moving quickly, just a portion (or none) of the audible accessibility information associated with a respective user-selectable object may be output.

In some embodiments, the activation region that corresponds to the first user-selectable object has a first size when a representative point for the first finger contact is located outside the activation region; and the activation region that corresponds to the first user-selectable object has a second size, larger than the first size, when the representative point for the first finger contact is located within the activation region (616). For example, FIG. 5B depicts that the key icon for the letter "F" has an activation region of a default size when the first finger contact is outside its default activation region. FIG. 5E depicts that the key icon for the letter "F" has an expanded activation region, which is larger than the default size, when the first finger contact is within the activation region.

While detecting the first finger contact at the activation region that corresponds to the first user-selectable object, the device initiates (618) output of audible accessibility information associated with the first user-selectable object. In some embodiments, the initiation of the output of audible accessibility information associated with the first user-selectable object is performed (620) in response to detecting the first finger contact at the activation region that corresponds to the first user-selectable object. For example, in response to detecting that a point within the first finger contact (e.g., the centroid of the first finger contact or other representative point within the first finger contact) has moved into a location on the touch-sensitive surface that corresponds to a current activation region for the first user-selectable object, the device generates an instruction to output audible accessibility information associated with the first user-selectable object. In FIG. 5F, the device 100 initiates the output of the pronunciation 548 of the key icon for the letter "F" when the device detects that the representative point 530 (FIG. 5E) for the first finger contact is within the current activation region of the key icon for the letter "F." In some embodiments, there may be a delay (e.g., 0.1 second) between the detection of the first finger contact and the output of the audible accessibility information such that nothing may be output if the first finger contact continues onto another user-searchable object before the delay lapses.

The device detects (622) termination of the first finger contact with the touch-sensitive surface while the first finger contact is at the activation region that corresponds to the first user-selectable object. In response to detecting the termination of the first finger contact (624), the device performs (626) a predefined operation associated with the first user-selectable object if the device has output at least a predefined portion of the audible accessibility information associated with the first user-selectable object when the termination of the first finger contact is detected. Alternatively, if the device has not output at least the predefined portion of the audible accessibility information associated with the first user-selectable object when termination of the first finger contact is detected, the device forgoes (628) performing the predefined operation associated with the first user-selectable object.

For example, the audible accessibility information associated with a character key (e.g., the letter "F") may be just the sound for the character. The device 'speaks' the character aloud (e.g., outputting the sound for "F" through speaker 111) when the location of the first finger contact on the touch-sensitive surface corresponds to the location of the "F" key on the display. If the device has already spoken "F" when lift off of the first finger contact is detected from a location corresponding to the "F" key, then the device will select/enter the "F" key. For example, as shown in FIGS. 5F and 5G, after the output of the pronunciation of the letter "F," the device 100 enters an instance of the letter "F" into the textbox 512 of FIG. 5A in response to detecting lift off of the first finger contact from the key icon for the letter "F." Conversely, if the device has not yet spoken "F" when termination of the first finger contact is detected from a location corresponding to the "F" key, then the device will not select/enter the "F" key. For example, if the pronunciation 548 of the letter "F" had not been output when termination 550 of the first finger contact 526 is detected, then the letter "F" would not be entered in the text box 512.—Thus, from a user's perspective, after the user hears the name of a character key that corresponds to the current location of the user's finger, the user may select/enter that character key simply by lifting off the user's finger. In this example, the predefined portion of the audible accessibility information that needs to be output before detecting lift off is all of the audible accessibility information.

As another example, the audible accessibility information associated with a character key (e.g., the letter "F") may be the sound for the character plus the use of the character in a word plus a repetition of the sound for the character. The device 'speaks' aloud the character, the use of the character in a word, and a repetition of the character (e.g., outputting the sound for ""F, . . . Frank, . . . F" through speaker 111) when the location of the first finger contact corresponds to the location of the "F" key on the display. If the device has already spoken at least the first "F" (but not necessarily "Frank" or the repetition of "F") when lift off of the first finger contact is detected from a location corresponding to the "F" key, then the device will select/enter the "F" key. For example, as shown in FIGS. 5F and 5G, after the output of the pronunciation of the letter "F," the device 100 enters an instance of the letter "F" into the textbox 512 of FIG. 5A in response to detecting lift off of the first finger contact from the key icon for the letter "F." Conversely, if the device has not yet spoken the first "F" when termination of the first finger contact is detected from a location corresponding to the "F" key, then the device will not select/enter the "F" key. For example, if the first pronunciation 548 of the letter "F" had not been output when termination 550 of the first finger contact 526 is detected, then the letter "F" would not be entered in the text box 512. Thus, from a user's perspective, after the user hears at least a predefined portion of the audible accessibility information associated with a character key (e.g., at least the name of a character key) that corresponds to the current location of the user's finger, the user may select/enter that character key simply by lifting off the user's finger. In this example, where the audible accessibility information associated with a character key is lengthy, detecting lift off from that key will select/enter the key when at least a predefined portion of the audible accessibility information has been output (e.g., the initial sounding of the character "F"). Thus, from the user's perspective, after the user hears the name of a character key that corresponds to the current location of the user's finger, the user may select/enter that character key simply by lifting off the user's finger, without having to hear the rest of the audible accessibility information for that character key.

Note that the predefined operation associated with the first user-selectable object is also not performed if termination of the first finger contact is detected when the first finger contact is at a location that does not correspond to the first user-selectable object (e.g., lift off of the first finger contact is detected when the representative point for the first finger contact is located outside the activation region for the first user-selectable object).

In some embodiments, within a predefined time period after performing the predefined operation associated with the first user-selectable object (630): the device detects (632) a second finger contact with the touch-sensitive surface at the activation region that corresponds to the first user-selectable object in the first plurality of user-selectable objects on the display and also detects (634) termination of the second finger contact with the touch-sensitive surface while the second finger contact is at the activation region that corresponds to the first user-selectable object. For example, FIGS. 5J and 5K depict the second finger contact 558 with the key icon for the letter "F" and the termination of the second finger contact 558, respectively. In response to detecting the termination of the second finger contact, the device performs (636) the predefined operation associated with the first user-selectable object regardless of whether the device has output at least the predefined portion of the audible accessibility information associated with the first user-selectable object in response to detecting the second finger contact with the touch-sensitive surface at the activation region that corresponds to the first user-selectable object. For example, as shown in FIG. 5K, the device 100 selects the letter "F" and enters a second instance of the letter "F" into the textbox 512 of FIG. 5A.

In some other embodiments, within a predefined time period after performing the predefined operation associated with the first user-selectable object, the device detects (638) a second finger contact with the touch-sensitive surface at the activation region that corresponds to the first user-selectable object in the first plurality of user-selectable objects on the display. Subsequently, the device detects (640) termination of the second finger contact with the touch-sensitive surface while the second finger contact is at the activation region that corresponds to the first user-selectable object. In other words, in these embodiments, the detection of the termination of the second finger contact may or may not be within the predefined time period. In response to detecting the termination of the second finger contact, the device performs (642) the predefined operation associated with the first user-selectable object regardless of whether the device has output at least the predefined portion of the audible accessibility information associated with the first user-selectable object in response to detecting the second finger contact with the touch-sensitive surface at the activation region that corresponds to the first user-selectable object.

In some embodiments, the device concurrently displays (644) a second plurality of user-selectable objects (e.g., keys other than character keys in keyboard 508) with the first plurality of user-selectable objects on the display. For example, FIGS. 5M-5O illustrate a second set of key icons including the space key icon 516 and the return key icon 520 displayed concurrently with the character keys. While detecting the first finger contact at an activation region that corresponds to a second user-selectable object in the second plurality of user-selectable objects, the device detects (646) a predefined user input (e.g., a finger contact 574, FIG. 5N, or a gesture made with contact 574, such as a tap gesture). In some embodiments, it may be desirable to have certain objects that are easy to select (e.g., character keys in a virtual keyboard) and other objects (e.g., a shift key, a keyboard-change key, a delete key, and/or a return key in the virtual keyboard) that are harder to select, to reduce accidental selection of the latter objects. For example, a virtual delete key may be selected in response to detecting a second finger tap gesture while the first finger contact is at a location that corresponds to the delete key (rather than in response to detecting lift-off of the first finger contact from the virtual delete key after audible accessibility information about the delete key has been output). Alternatively, the virtual delete key may be selected in response to detecting a single tap or double tap gesture immediately after detecting the termination of the first finger contact from a location that corresponds to the delete key.

In response to detecting the predefined user input, the device performs (648) a respective predefined operation associated with the second user-selectable object in the second plurality of user-selectable objects independent of whether the device has output audible accessibility information associated with the respective user-selectable object. In some other embodiments, in response to detecting the predefined user input (646), the device performs (650) a respective predefined operation associated with the second user-selectable object if the device has output at least a predefined portion of audible accessibility information associated with the second user-selectable object.

Figure 7B:
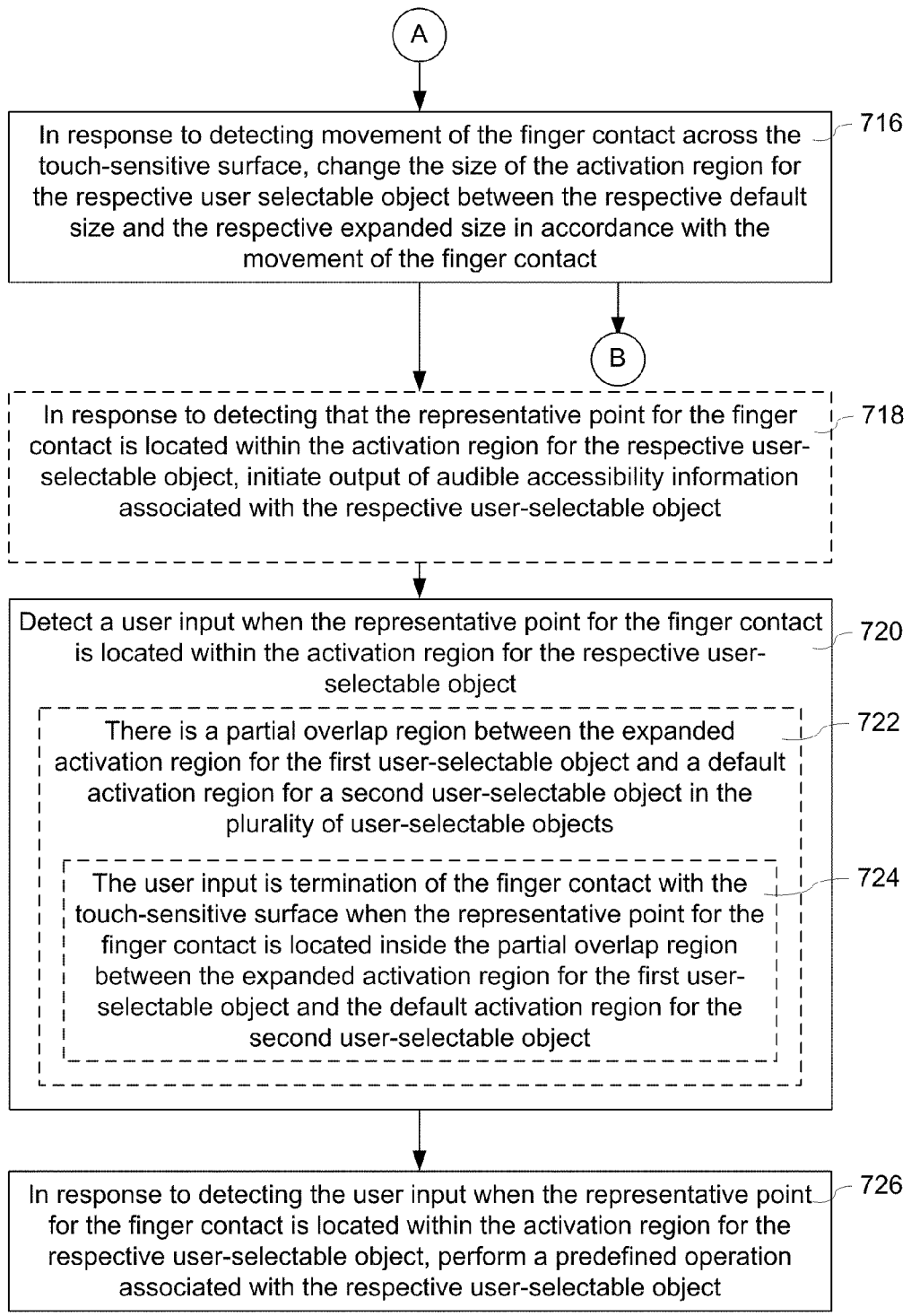
Figure 7C:
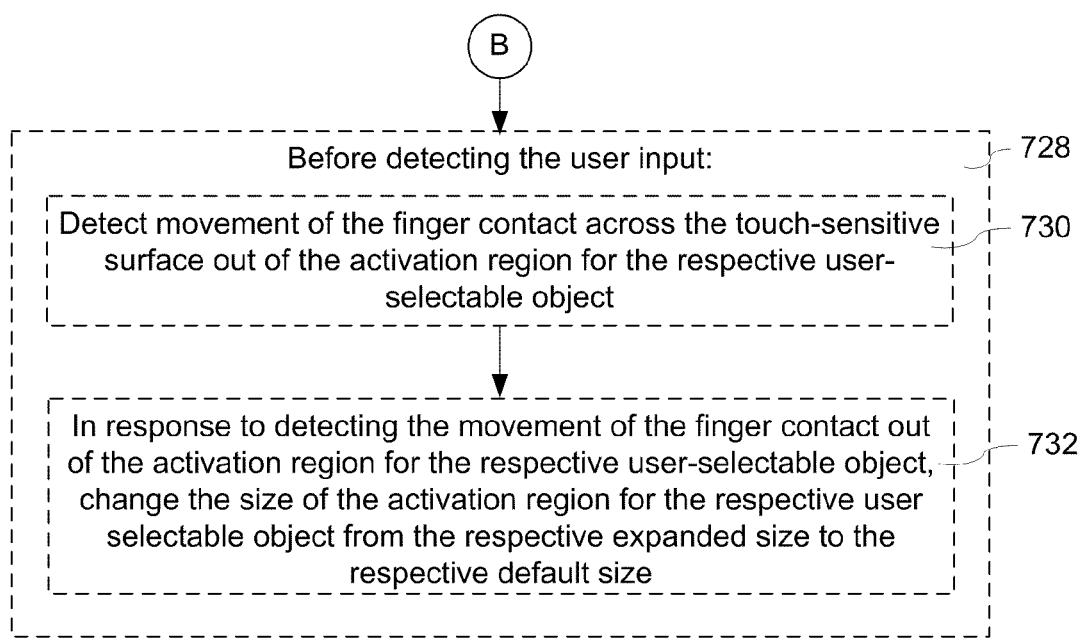
Figure 8B:
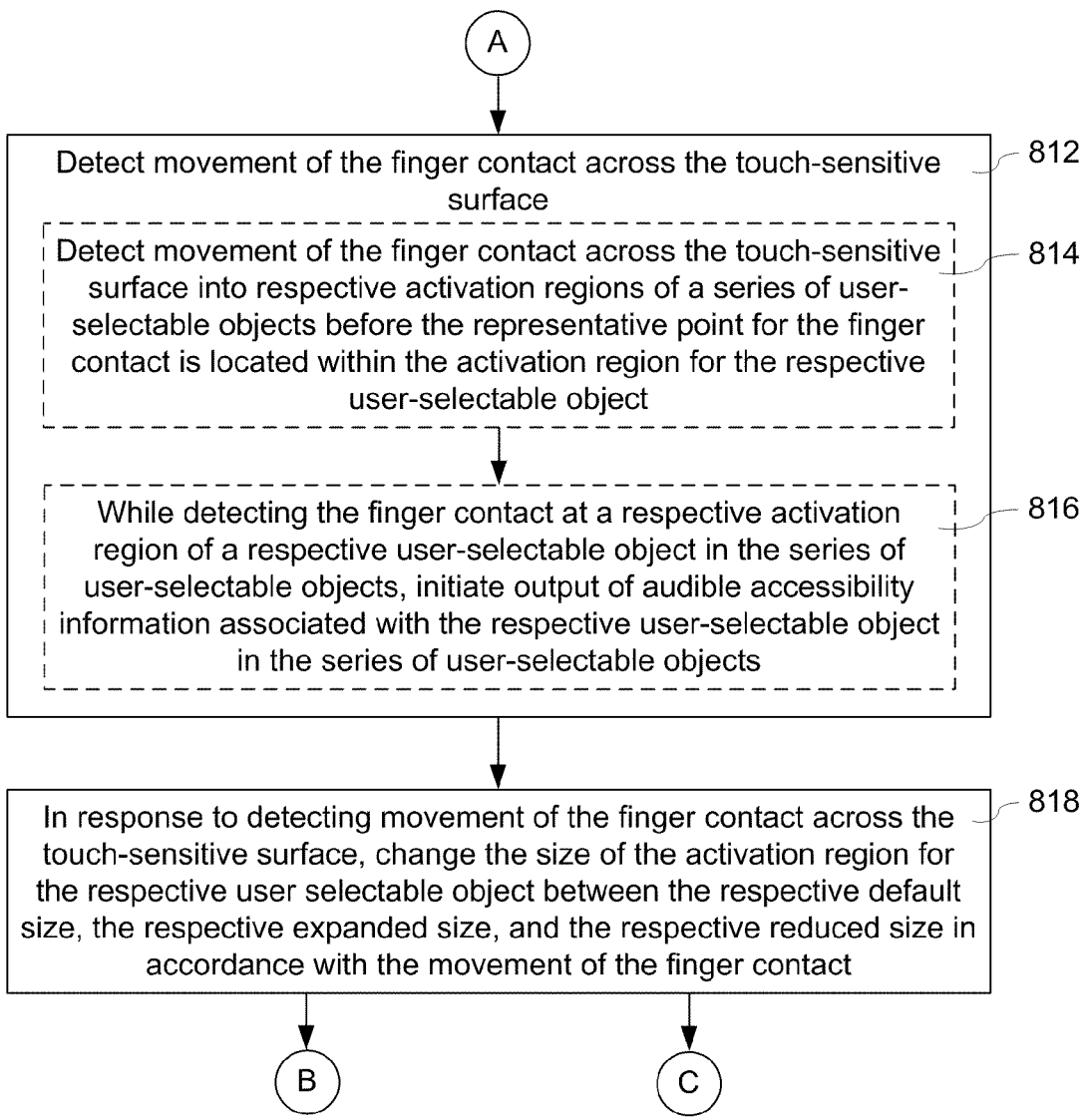
Figure 8C:
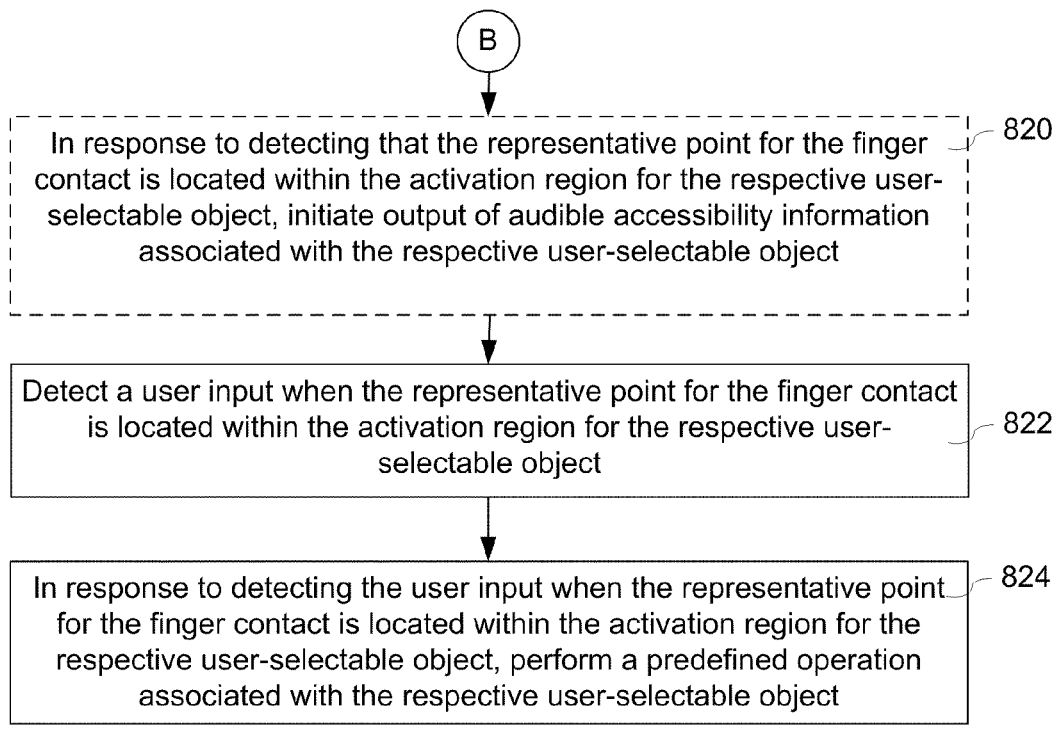
Figure 8D:
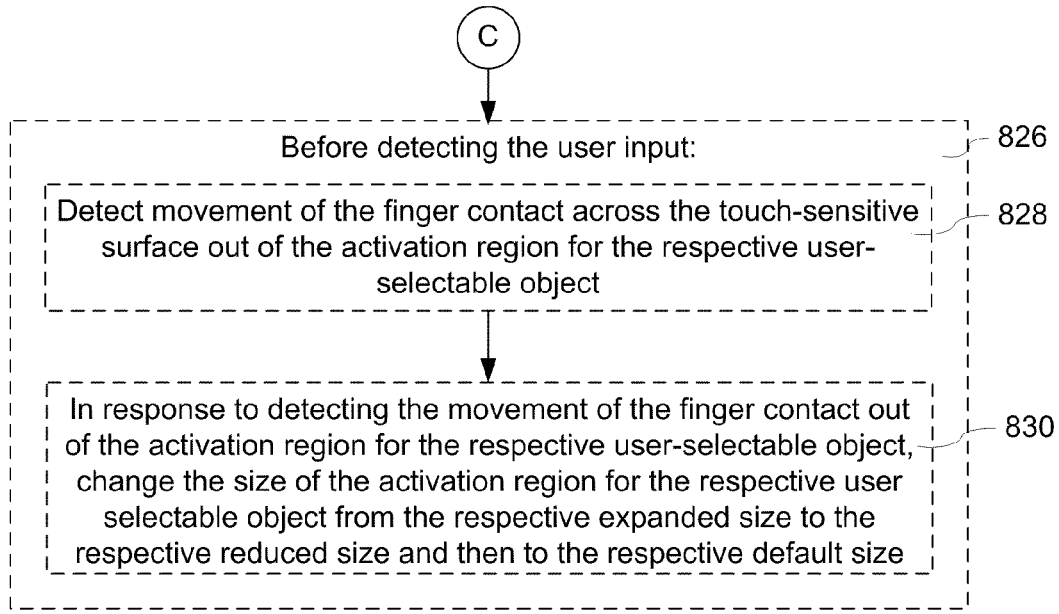

FIGS. 7A-7C are flow diagrams illustrating a method 700 of dynamically adjusting the size of an activation region for an object as a finger contact moves in accordance with some embodiments. The method 700 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 700 may be combined and/or the order of some operations may be changed.

As described below, the method 700 helps to reduce object activation errors due to finger jitter and enables faster, more accurate input using a touch-sensitive surface. The method reduces the cognitive burden on a user when navigating amongst objects via finger movements on a touch-sensitive surface, thereby creating a more efficient human-machine interface. For battery-operated computing devices, enabling faster, more accurate input using a touch-sensitive surface conserves power and increases the time between battery charges.

The device displays (702) a plurality of user-selectable objects on the display. The plurality of user-selectable objects may be a subset of all of the user-selectable objects on the display, such as the alphanumeric keys in a soft keyboard. A respective user-selectable object has a corresponding activation region on the touch-sensitive surface with an activation region size. The activation region size for the respective user-selectable object has a respective default size when a representative point for a finger contact (e.g., the centroid of the finger contact or other representative point within the finger contact) is located outside the activation region for the respective user-selectable object. The activation region size for the respective user-selectable object has a respective expanded size, larger than the respective default size, when the representative point for the finger contact is located within the activation region for the respective user-selectable object. For example, FIGS. 5B and 5C depict a group of key icons, each key icon having an activation region with a respective default size (e.g., default size 524 for the "B" icon, FIG. 5B) and a respective expanded size (e.g., expanded size 528 for the "B" icon, FIG. 5C). In some embodiments, the display is a touch screen display and the touch-sensitive surface is on the display (704). In some embodiments, the first plurality of user-selectable objects are character keys in a virtual keyboard (706) (e.g., alphanumeric keys in the virtual keyboard 508 of FIG. 5A). In some embodiments, the respective default size activation region (e.g., default size 524 for the "B" icon, FIG. 5B) for the respective user-selectable object is inside the respective expanded size activation region (e.g., expanded size 528 for the "B" icon, FIG. 5C) for the respective user-selectable object (708).

The device detects (710) movement of the finger contact across the touch-sensitive surface. For example, as described above, FIGS. 5C-5E illustrate movement of the first finger contact 526 from the key icon for the letter "B" to the activation region of the key icon for the letter "F."

In some embodiments, the device detects (712) movement of the finger contact across the touch-sensitive surface into respective activation regions of a series of user-selectable objects (e.g., the key icon for the letter "B" in FIG. 5C and the key icon for the letter "V" in FIG. 5D, etc.) before the representative point for the finger contact is located within the activation region for the respective user-selectable object (e.g., the key icon for the letter "F" in FIG. 5E). While detecting the finger contact at a respective activation region of a respective user-selectable object in the series of user-selectable objects, the device initiates (714) output of audible accessibility information associated with the respective user-selectable object in the series of user-selectable objects (e.g., the pronunciation 532 of the letter "B" in FIG. 5C and the pronunciation 538 of the letter "V" in FIG. 5D).

In response to detecting movement of the finger contact across the touch-sensitive surface, the device changes (716) the size of the activation region for the respective user-selectable object between the respective default size and the respective expanded size in accordance with the movement of the finger contact. For example, FIGS. 5B-5E show the activation regions for the key icons corresponding to the letters "B," "V," and "F" changing between their respective default sizes and their respective expanded sizes as the first finger contact moves across the touch-sensitive surface from the "B" icon to the "V" icon to the "F" icon.

In some embodiments, in response to detecting that the representative point for the finger contact is located within the activation region for the respective user-selectable object, the device initiates (718) output of audible accessibility information associated with the respective user-selectable object.

The devices detects (720) a user input when the representative point for the finger contact is located within the activation region for the respective user-selectable object (e.g., detecting termination (lift-off) of the finger contact or detecting a gesture, such as a tap gesture, with the finger contact or with a second finger contact).

For example, FIGS. 5F and 5G depict that, in response to the termination of the first finger contact, the device enters an instance of the letter "F" into the textbox 512 of FIG. 5A. In some embodiments, there is a partial overlap region between the expanded activation region for the first user-selectable object and a default activation region for a second user-selectable object in the plurality of user-selectable objects (722). As shown in FIG. 5C, the expanded activation region 528 of the key icon for the letter "B" is partially overlapped with the default activation regions of the key icons for the letters "H," "G," and "V." In some embodiments, the user input is termination of the finger contact with the touch-sensitive surface when the representative point for the finger contact is located inside the partial overlap region between the expanded activation region for the first user-selectable object and the default activation region for the second user-selectable object (724). For example, FIGS. 5E-5G depict termination of the first finger contact with the touch-sensitive surface when the representative point for the finger contact 530-d is within the partial overlap region between the expanded activation region for the letter-"F" key icon and the default activation region for the letter-"G" key icon.

In response to detecting the user input when the representative point for the finger contact is located within the activation region for the respective user-selectable object, the device performs (726) a predefined operation associated with the respective user-selectable object (e.g., selecting/entering an instance of the letter "F" as shown in FIG. 5G).

In some embodiments, after detecting the movement of the finger contact but before detecting the user input (728), the device detects (730) movement of the finger contact across the touch-sensitive surface out of the activation region for the respective user-selectable object. In response to detecting the movement of the finger contact out of the activation region for the respective user-selectable object, the device changes (732) the size of the activation region for the respective user-selectable object from the respective expanded size to the respective default size. For example, FIGS. 5C and 5D depict that the activation region for the letter "B" key icon changes from its expanded size 528 back to its default size 524.

FIGS. 8A-8D are flow diagrams illustrating a method 800 of dynamically adjusting the size of an activation region for an object as a finger contact moves in accordance with some embodiments. The method 800 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 800 may be combined and/or the order of some operations may be changed.

As described below, the method 800 helps to reduce object activation errors due to finger jitter and enables faster, more accurate input using a touch-sensitive surface. The method reduces the cognitive burden on a user when navigating amongst objects via finger movements on a touch-sensitive surface, thereby creating a more efficient human-machine interface. For battery-operated computing devices, enabling faster, more accurate input using a touch-sensitive surface conserves power and increases the time between battery charges.

The device displays (802) a plurality of user-selectable objects on the display. The plurality of user-selectable objects may be a subset of all of the user-selectable objects on the display, such as the alphanumeric keys in a soft keyboard. A respective user-selectable object has a corresponding activation region on the touch-sensitive surface with an activation region size. The activation region size for the respective user-selectable object has a respective default size when a representative point for a finger contact (e.g., the centroid of the finger contact or other representative point within the finger contact) is located outside the activation region for the respective user-selectable object and the representative point for the finger contact is not located in an activation region for a user-selectable object that is adjacent to the respective user-selectable object on the display. The activation region size for the respective user-selectable object has a respective expanded size, larger than the respective default size, when the representative point for the finger contact is located within the activation region for the respective user-selectable object. The activation region size for the respective user-selectable object has a respective reduced size, smaller than the respective default size, when the representative point for the finger contact is located within an activation region for a user-selectable object that is adjacent to the respective user-selectable object on the display. For example, FIG. 5P depicts a group of key icons, each key icon having an activation region with a respective default size (e.g., default activation regions 580-a, 580-b, and 580-c in FIG. 5P). In addition, FIG. 5Q depicts that the key icon for the letter "D" has an activation region with an expanded size 584-a when the representative point 582-a for the finger contact is located within the activation region for the "D" icon. While the representative point 582-a is within the activation region for the "D" icon, the key icon for the letter "S," which is adjacent to the key icon for the letter "D," has an activation region with a reduced size 586-a, which is smaller than its corresponding default size 580-a.

In some embodiments, the display is a touch screen display and the touch-sensitive surface is on the display (804). In some embodiments, the first plurality of user-selectable objects are character keys in a virtual keyboard (806) (e.g., alphanumeric keys in the virtual keyboard 508 of FIG. 5A).

In some embodiments, the respective reduced size activation region for the respective user-selectable object (e.g., reduced size 586-*c* for the "D" icon, FIG. 5T) is inside the respective default size activation region for the respective user-selectable object (e.g., default size 580-*b* for the "D" icon, FIG. 5P); and the respective default size activation region for the respective user-selectable object is inside the respective expanded size activation region for the respective user-selectable object (e.g., expanded size 584-*a* for the "D" icon, FIG. 5Q) (808).

In some embodiments, the respective reduced size activation region for the respective user-selectable object does not overlap the activation region for the user-selectable object that is adjacent to the respective user-selectable object on the display (810). For example, in FIG. 5T, the reduced size activation region 586-*c* for the "D" icon does not overlap either the expanded size activation region 584-*b* for the adjacent "F" icon or the default size activation region 580-*a* for the adjacent "S" icon.

The device detects (812) movement of the finger contact across the touch-sensitive surface. For example, as described above, FIGS. 5P-5U illustrate movement of the finger contact from the key icon for the letter "D" to the activation region of the key icon for the letter "F."

In some embodiments, the device detects (814) movement of the finger contact across the touch-sensitive surface into respective activation regions of a series of user-selectable objects (e.g., the key icon for the letter "B" in FIG. 5C and the key icon for the letter "V" in FIG. 5D, etc.) before the representative point for the finger contact is located within the activation region for the respective user-selectable object (e.g., the key icon for the letter "F" in FIG. 5E). While detecting the finger contact at a respective activation region of a respective user-selectable object in the series of user-selectable objects, the device initiates (816) output of audible accessibility information associated with the respective user-selectable object in the series of user-selectable objects (see, e.g., the pronunciation 532 of the letter "B" in FIG. 5C and the pronunciation 538 of the letter "V" in FIG. 5D). Note that the key icons in FIGS. 5A-5O may have two activation regions for each icon—a default activation region and an expanded activation region (e.g., as discussed above with respect to method 700)—or these icons may have three activation regions for each icon—a default activation region, an expanded activation region, and a reduced activation region—analogous to the three types of activation regions shown in FIGS. 5P-5U.

In response to detecting movement of the finger contact across the touch-sensitive surface, the device changes (818) the size of the activation region for the respective user-selectable object between the respective default size, the respective expanded size, and the respective reduced size in accordance with the movement of the finger contact. For example, FIGS. 5P-5U show the activation region for the key icon of the letter "D" changing between its default size 580-*b*, its expanded size 584-*a*, and its reduced size 586-*c* as finger contact 582 touches down and moves across the touch sensitive surface.

In some embodiments, in response to detecting that the representative point for the finger contact is located within the activation region for the respective user-selectable object, the device initiates (820) output of audible accessibility information associated with the respective user-selectable object (e.g., the pronunciation 532 of the letter "B" in FIG. 5C and the pronunciation 538 of the letter "V" in FIG. 5D).

The device detects (822) a user input when the representative point for the finger contact is located within the activation region for the respective user-selectable object (e.g., detecting termination (lift-off) of the finger contact or detecting a gesture, such as a tap gesture, with the finger contact or with a second finger contact). In response to detecting the user input when the representative point for the finger contact is located within the activation region for the respective user-selectable object, the device performs (824) a predefined operation associated with the respective user-selectable object (e.g., selecting/entering an instance of the letter "F" as shown in FIG. 5G).

In some embodiments, after detecting the movement of the finger contact but before detecting the user input (826), the device detects (828) movement of the finger contact across the touch-sensitive surface out of the activation region for the respective user-selectable object. In response to detecting the movement of the finger contact out of the activation region for the respective user-selectable object, the device changes (830) the size of the activation region for the respective user-selectable object from the respective expanded size to the respective reduced size and then to the respective default size. For example, in response to detecting movement of the finger contact from 582-*b*(FIG. 5R) to 582-*c*(FIG. 5S) the device changes the size of the activation region for the "D" icon from its expanded size 584-*a*(FIG. 5R) to its reduced size 586-*c* (FIG. 5T). If the device then detected continued movement of finger contact 582 to the right over the "G" icon (not shown), then the device would change the size of the activation region for the "D" icon from its reduced size 586-*c* to its default size 580-*b*.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

The operations described above with reference to FIGS. 6A-6E, 7A-7C, and 8A-8D may be implemented by components depicted in FIGS. 1A-1C. For example, detection operations 608, 610, 622, 632, 634, and 640 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176, object updater 177 or GUI updater 178 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1C.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An accessible electronic device, comprising:
a touch-sensitive surface;
a display;
one or more processors;
memory; and
one or more programs, wherein the one or more programs are stored in the memory and configured to be executed by the one or more processors, the one or more programs including instructions for:
displaying a first plurality of user-selectable objects on the display;
detecting a first finger contact at a first location on the touch-sensitive surface;
detecting movement of the first finger contact across the touch sensitive surface from the first location to an activation region that corresponds to a first user-selectable object in the first plurality of user-selectable objects on the display;
while detecting the first finger contact at the activation region that corresponds to the first user-selectable object, initiating output of audible accessibility information associated with the first user-selectable object;
detecting termination of the first finger contact with the touch-sensitive surface while the first finger contact is at the activation region that corresponds to the first user-selectable object; and,
in response to detecting the termination of the first finger contact:
performing a predefined operation associated with the first user-selectable object if the device has output at least a predefined portion of the audible accessibility information associated with the first user-selectable object when the termination of the first finger contact is detected; and
forgoing performing the predefined operation associated with the first user-selectable object if the device has not output at least the predefined portion of the audible accessibility information associated with the first user-selectable object when termination of the first finger contact is detected.

2. The device of claim 1, wherein the first plurality of user-selectable objects are character keys in a virtual keyboard.

3. The device of claim 1, wherein detecting movement of the first finger contact across the touch sensitive surface from the first location to the activation region that corresponds to a first user-selectable object includes detecting movement of the first finger contact at activation regions that correspond to a series of user-selectable objects prior to detecting the first finger contact at the activation region that corresponds to the first user-selectable object, the method including:
while detecting the first finger contact at a respective activation region that corresponds to a respective user-selectable object in the series of user-selectable objects, initiating output of audible accessibility information associated with the respective user-selectable object.

4. The device of claim 1, wherein initiating output of audible accessibility information associated with the first user-selectable object is performed in response to detecting the first finger contact at the activation region that corresponds to the first user-selectable object.

5. The device of claim 1, including instructions for:
concurrently displaying a second plurality of user-selectable objects with the first plurality of user-selectable objects on the display;
while detecting the first finger contact at an activation region that corresponds to a second user-selectable object in the second plurality of user-selectable objects, detecting a predefined user input; and
in response to detecting the predefined user input, performing a respective predefined operation associated with the second user-selectable object in the second plurality of user-selectable objects independent of whether the device has output audible accessibility information associated with the respective user-selectable object.

6. The device of claim 1, including instructions for:
concurrently displaying a second plurality of user-selectable objects with the first plurality of user-selectable objects on the display;
while detecting the first finger contact at an activation region that corresponds to a second user-selectable object in the second plurality of user-selectable objects, detecting a predefined user input; and
in response to detecting the predefined user input, performing a respective predefined operation associated with the second user-selectable object if the device has output at least a predefined portion of audible accessibility information associated with the second user-selectable object.

7. The device of claim 1, wherein:
the activation region that corresponds to the first user-selectable object has a first size when a representative point for the first finger contact is located outside the activation region; and
the activation region that corresponds to the first user-selectable object has a second size, larger than the first size, when the representative point for the first finger contact is located within the activation region.

8. The device of claim 1, including instructions for:
within a predefined time period after performing the predefined operation associated with the first user-selectable object, detecting a second finger contact with the touch-sensitive surface at the activation region that corresponds to the first user-selectable object in the first plurality of user-selectable objects on the display;
detecting termination of the second finger contact with the touch-sensitive surface while the second finger contact is at the activation region that corresponds to the first user-selectable object; and,
in response to detecting the termination of the second finger contact, performing the predefined operation associated with the first user-selectable object regardless of whether the device has output at least the predefined portion of the audible accessibility information associated with the first user-selectable object in response to detecting the second finger contact with the touch-sensitive surface at the activation region that corresponds to the first user-selectable object.

9. The device of claim 1, including:
within a predefined time period after performing the predefined operation associated with the first user-selectable object:
detecting a second finger contact with the touch-sensitive surface at the activation region that corresponds to the first user-selectable object in the first plurality of user-selectable objects on the display, and
detecting termination of the second finger contact with the touch-sensitive surface while the second finger contact is at the activation region that corresponds to the first user-selectable object; and, in response to detecting the termination of the second finger contact, performing the predefined operation associated with the first user-selectable object regardless of whether the device has output at least the predefined portion of the audible accessibility information associated with the first user-selectable object in response to detecting the second finger contact with the touch-sensitive surface at the activation region that corresponds to the first user-selectable object.

10. A method, comprising:

at an accessible electronic device with a touch-sensitive surface and a display:

displaying a first plurality of user-selectable objects on the display;

detecting a first finger contact at a first location on the touch-sensitive surface;

detecting movement of the first finger contact across the touch sensitive surface from the first location to an activation region that corresponds to a first user-selectable object in the first plurality of user-selectable objects on the display;

while detecting the first finger contact at the activation region that corresponds to the first user-selectable object, initiating output of audible accessibility information associated with the first user-selectable object;

detecting termination of the first finger contact with the touch-sensitive surface while the first finger contact is at the activation region that corresponds to the first user-selectable object; and, in response to detecting the termination of the first finger contact:

performing a predefined operation associated with the first user-selectable object if the device has output at least a predefined portion of the audible accessibility information associated with the first user-selectable object when the termination of the first finger contact is detected; and forgoing performing the predefined operation associated with the first user-selectable object if the device has not output at least the predefined portion of the audible accessibility information associated with the first user-selectable object when termination of the first finger contact is detected.

11. The method of claim 10, wherein initiating output of audible accessibility information associated with the first user-selectable object is performed in response to detecting the first finger contact at the activation region that corresponds to the first user-selectable object.

12. The method of claim 10, wherein:

the activation region that corresponds to the first user-selectable object has a first size when a representative point for the first finger contact is located outside the activation region; and the activation region that corresponds to the first user-selectable object has a second size, larger than the first size, when the representative point for the first finger contact is located within the activation region.

13. The method of claim 10, including:

within a predefined time period after performing the predefined operation associated with the first user-selectable object, detecting a second finger contact with the touch-sensitive surface at the activation region that corresponds to the first user-selectable object in the first plurality of user-selectable objects on the display;

detecting termination of the second finger contact with the touch-sensitive surface while the second finger contact is at the activation region that corresponds to the first user-selectable object; and, in response to detecting the termination of the second finger contact, performing the predefined operation associated with the first user-selectable object regardless of whether the device has output at least the, predefined portion of the audible accessibility information associated with the first user-selectable object in response to detecting the second finger contact with the touch-sensitive surface at the activation region that corresponds to the first user-selectable object.

14. The method of claim 10, including:

within a predefined time period after performing the predefined operation associated with the first user-selectable object:

detecting a second finger contact with the touch-sensitive surface at the activation region that corresponds to the first user-selectable object in the first plurality of user-selectable objects on the display, and detecting termination of the second finger contact with the touch-sensitive surface while the second finger contact is at the activation region that corresponds to the first user-selectable object; and, in response to detecting the termination of the second finger contact, performing the predefined operation associated with the first user-selectable object regardless of whether the device has output at least the predefined portion of the audible accessibility information associated with the first user-selectable object in response to detecting the second finger contact with the touch-sensitive surface at the activation region that corresponds to the first user-selectable object.

15. The method of claim 10, wherein the first plurality of user-selectable objects are character keys in a virtual keyboard.

16. The method of claim 10, wherein detecting movement of the first finger contact across the touch sensitive surface from the first location to the activation region that corresponds to a first user-selectable object includes detecting movement of the first finger contact at activation regions that correspond to a series of user-selectable objects prior to detecting the first finger contact at the activation region that corresponds to the first user-selectable object, the method including:

while detecting the first finger contact at a respective activation region that corresponds to a respective user-selectable object in the series of user-selectable objects, initiating output of audible accessibility information associated with the respective user-selectable object.

17. A non-transitory computer readable storage medium storing one or more programs, the one or more programs comprising instructions, which when executed by an accessible electronic device with a touch-sensitive surface and a display, cause the device to:

display a first plurality of user-selectable objects on the display;

detect a first finger contact at a first location on the touch-sensitive surface;

detect movement of the first finger contact across the touch sensitive surface from the first location to an activation region that corresponds to a first user-selectable object in the first plurality of user-selectable objects on the display;

while detecting the first finger contact at the activation region that corresponds to the first user-selectable object, initiate output of audible accessibility information associated with the first user-selectable object;

detect termination of the first finger contact with the touch-sensitive surface while the first finger contact is at the activation region that corresponds to the first user-selectable object; and, in response to detecting the termination of the first finger contact:

perform a predefined operation associated with the first user-selectable object if the device has output at least a predefined portion of the audible accessibility information associated with the first user-selectable object when the termination of the first finger contact is detected; and forgo performing the predefined operation associated with the first user-selectable object if the device has not output at least the predefined portion of the audible accessibility information associated with the first user-selectable object when termination of the first finger contact is detected.

18. The computer readable storage medium of claim 17, wherein initiating output of audible accessibility information associated with the first user-selectable object is performed in response to detecting the first finger contact at the activation region that corresponds to the first user-selectable object.

19. The computer readable storage medium of claim 17, wherein:

the activation region that corresponds to the first user-selectable object has a first size when a representative point for the first finger contact is located outside the activation region; and the activation region that corresponds to the first user-selectable object has a second size, larger than the first size, when the representative point for the first finger contact is located within the activation region.

20. The computer readable storage medium of claim 17, including instructions which cause the device to:

within a predefined time period after performing the predefined operation associated with the first user-selectable object, detect a second finger contact with the touch-sensitive surface at the activation region that corresponds to the first user-selectable object in the first plurality of user-selectable objects on the display;

detect termination of the second finger contact with the touch-sensitive surface while the second finger contact is at the activation region that corresponds to the first user-selectable object; and, in response to detecting the termination of the second finger contact, perform the predefined operation associated with the first user-selectable object regardless of whether the device has output at least the predefined portion of the audible accessibility information associated with the first user-selectable object in response to detecting the second finger contact with the touch-sensitive surface at the activation region that corresponds to the first user-selectable object.

21. The computer readable storage medium of claim 17, including instructions which cause the device to:

within a predefined time period after performing the predefined operation associated with the first user-selectable object:

detect a second finger contact with the touch-sensitive surface at the activation region that corresponds to the first user-selectable object in the first plurality of user-selectable objects on the display, and detect termination of the second finger contact with the touch-sensitive surface while the second finger contact is at the activation region that corresponds to the first user-selectable object; and, in response to detecting the termination of the second finger contact, perform the predefined operation associated with the first user-selectable object regardless of whether the device has output at least the predefined portion of the audible accessibility information associated with the first user-selectable object in response to detecting the second finger contact with the touch-sensitive surface at the activation region that corresponds to the first user-selectable object.

22. The computer readable storage medium of claim 17, wherein the first plurality of user-selectable objects are character keys in a virtual keyboard.

23. The computer readable storage medium of claim 17, wherein detecting movement of the first finger contact across the touch sensitive surface from the first location to the activation region that corresponds to a first user-selectable object includes detecting movement of the first finger contact at activation regions that correspond to a series of user-selectable objects prior to detecting the first finger contact at the activation region that corresponds to the first user-selectable object, and the computer readable storage medium includes instructions which cause the device to:

while detecting the first finger contact at a respective activation region that corresponds to a respective user-selectable object in the series of user-selectable objects, initiate output of audible accessibility information associated with the respective user-selectable object.

* * * * *

UNITED STATES PATENT AND TRADEMARK OFFICE
CERTIFICATE OF CORRECTION

| | |
|---|---|
| PATENT NO. | : 8,707,195 B2 |
| APPLICATION NO. | : 12/795633 |
| DATED | : April 22, 2014 |
| INVENTOR(S) | : Christopher Brian Fleizach et al. |

Page 1 of 1

It is certified that error appears in the above-identified patent and that said Letters Patent is hereby corrected as shown below:

In the Claims

In column 48, line 8, Claim 13, delete "the," and insert -- the --, therefor.

Signed and Sealed this
Sixteenth Day of September, 2014

Michelle K. Lee
*Deputy Director of the United States Patent and Trademark Office*